(12) United States Patent
Kawai et al.

(10) Patent No.: US 8,985,296 B2
(45) Date of Patent: Mar. 24, 2015

(54) CLUTCH UNIT

(75) Inventors: Masahiro Kawai, Iwata (JP); Kouji Isoda, Iwata (JP); Yumiko Mineno, Iwata (JP)

(73) Assignee: NTN Corporation, Osaka (JP)

( * ) Notice: Subject to any disclaimer, the term of this patent is extended or adjusted under 35 U.S.C. 154(b) by 256 days.

(21) Appl. No.: 13/521,143

(22) PCT Filed: Feb. 10, 2011

(86) PCT No.: PCT/JP2011/052826
§ 371 (c)(1),
(2), (4) Date: Jul. 9, 2012

(87) PCT Pub. No.: WO2011/102285
PCT Pub. Date: Aug. 25, 2011

(65) Prior Publication Data
US 2012/0279819 A1 Nov. 8, 2012

(30) Foreign Application Priority Data

Feb. 18, 2010 (JP) .................................. 2010-033719
Feb. 18, 2010 (JP) .................................. 2010-033723
Feb. 18, 2010 (JP) .................................. 2010-033727

(51) Int. Cl.
*F16D 41/08* (2006.01)
*F16D 5/00* (2006.01)
(Continued)

(52) U.S. Cl.
CPC ............ *F16D 41/105* (2013.01); *B60N 2/1615* (2013.01); *B60N 2/167* (2013.01); *B60N 2/168* (2013.01); *B60N 2/444* (2013.01); *F16D 41/088* (2013.01); *F16D 43/02* (2013.01)
USPC ............ 192/223.2; 192/15; 192/47; 192/55.2

(58) Field of Classification Search
USPC ............... 192/12 B, 15, 19, 32, 41 R, 43, 44, 192/45.006, 47, 54.52, 55.2, 223.2
See application file for complete search history.

(56) References Cited

U.S. PATENT DOCUMENTS 8,113,326 B2 * 2/2012 Kawai ............................. 192/15
8,424,665 B2 * 4/2013 Kawai et al. ............... 192/223.2
(Continued)

FOREIGN PATENT DOCUMENTS

CN 1392934 1/2003
JP 62-250223 10/1987
(Continued)

OTHER PUBLICATIONS

Chinese Office Action issued May 6, 2014 in corresponding Chinese Application No. 201180009394.1 with English translation.
(Continued)

*Primary Examiner* — Jacob S Scott
(74) *Attorney, Agent, or Firm* — Wenderoth, Lind & Ponack, L.L.P.

(57) ABSTRACT

A clutch unit includes lever-side clutch portion for controlling transmission and interruption of rotational torque to an output side through lever operation and a brake-side clutch portion for transmitting torque input from the lever-side clutch portion to the output side and for interrupting torque reversely input from the output side. The lever-side clutch portion has an outer centering spring provided between a lever-side outer ring to be rotated through the lever operation and a cover restricted in rotation, for accumulating an elastic force obtained by torque input from the lever-side outer ring and for restoring the lever-side outer ring to a neutral state with the accumulated elastic force through releasing of the torque input from the input-side member. The outer centering spring has a band plate-like spring member having a C-shape.

20 Claims, 31 Drawing Sheets

(51) Int. Cl.
  *B60N 2/16* (2006.01)
  *F16D 41/10* (2006.01)
  *B60N 2/44* (2006.01)
  *F16D 43/02* (2006.01)

(56) References Cited

U.S. PATENT DOCUMENTS

| | | | |
|---|---|---|---|
| 8,678,155 B2 * | 3/2014 | Kawai et al. | 192/45.017 |
| 2004/0099498 A1 | 5/2004 | Kurita et al. | |
| 2011/0005881 A1 | 1/2011 | Kawai et al. | |

FOREIGN PATENT DOCUMENTS

| | | |
|---|---|---|
| JP | 06-150604 | 5/1994 |
| JP | 2001-165199 | 6/2001 |
| JP | 2002-089591 | 3/2002 |
| JP | 2003-166555 | 6/2003 |
| JP | 2005-325906 | 11/2005 |
| JP | 2008-075777 | 4/2008 |
| JP | 2009-30632 | 2/2009 |
| JP | 2009-210114 | 9/2009 |
| JP | 2009-210117 | 9/2009 |
| JP | 2009-210119 | 9/2009 |
| JP | 2009-299869 | 12/2009 |
| JP | 2010-019343 | 1/2010 |

OTHER PUBLICATIONS

International Search Report issued May 17, 2011 in International (PCT) Application No. PCT/JP2011/052826.
International Preliminary Report on Patentability and Written Opinion of the International Searching Authority issued Sep. 27, 2012 in International (PCT) Application No. PCT/JP2011/052826.
Japanese Office Action issued Sep. 25, 2013 in corresponding Japanese Patent Application No. 2010-033723 with partial English translation.
Japanese Office Action issued Sep. 30, 2013 in corresponding Japanese Patent Application No. 2010-033727 with partial English translation.
Extended European Search Report issued Nov. 14, 2014 in corresponding European Application No. 11744572.6.

* cited by examiner

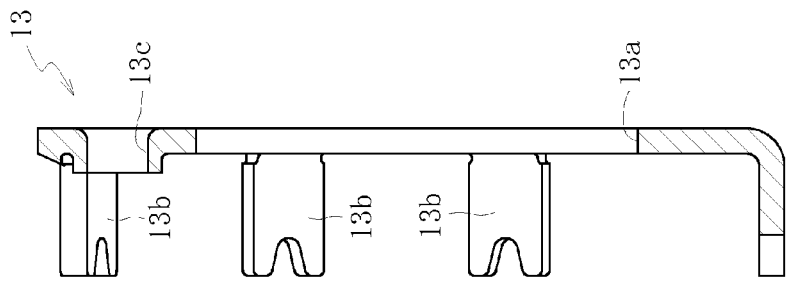
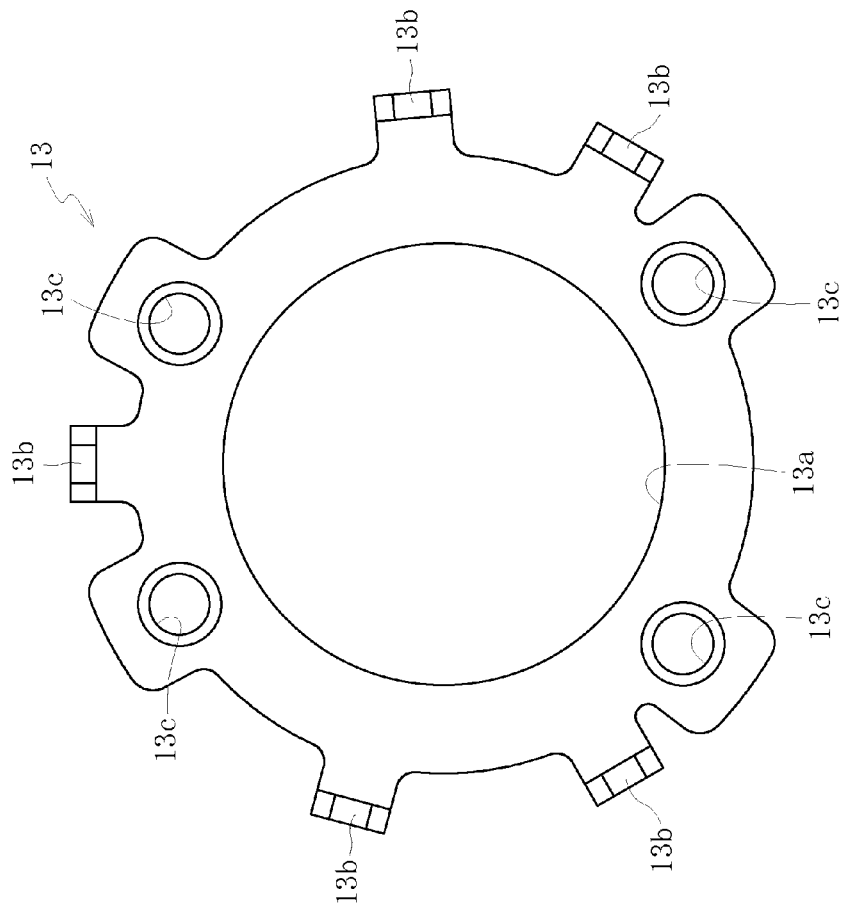

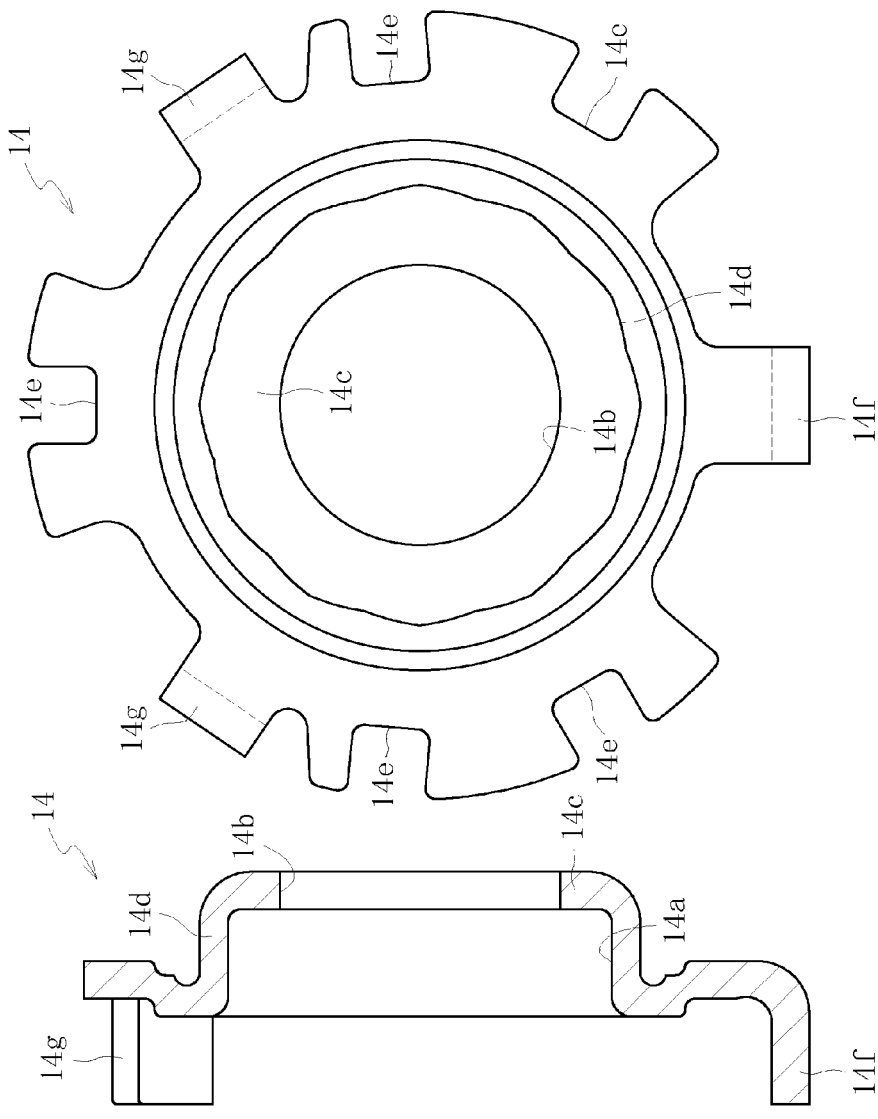

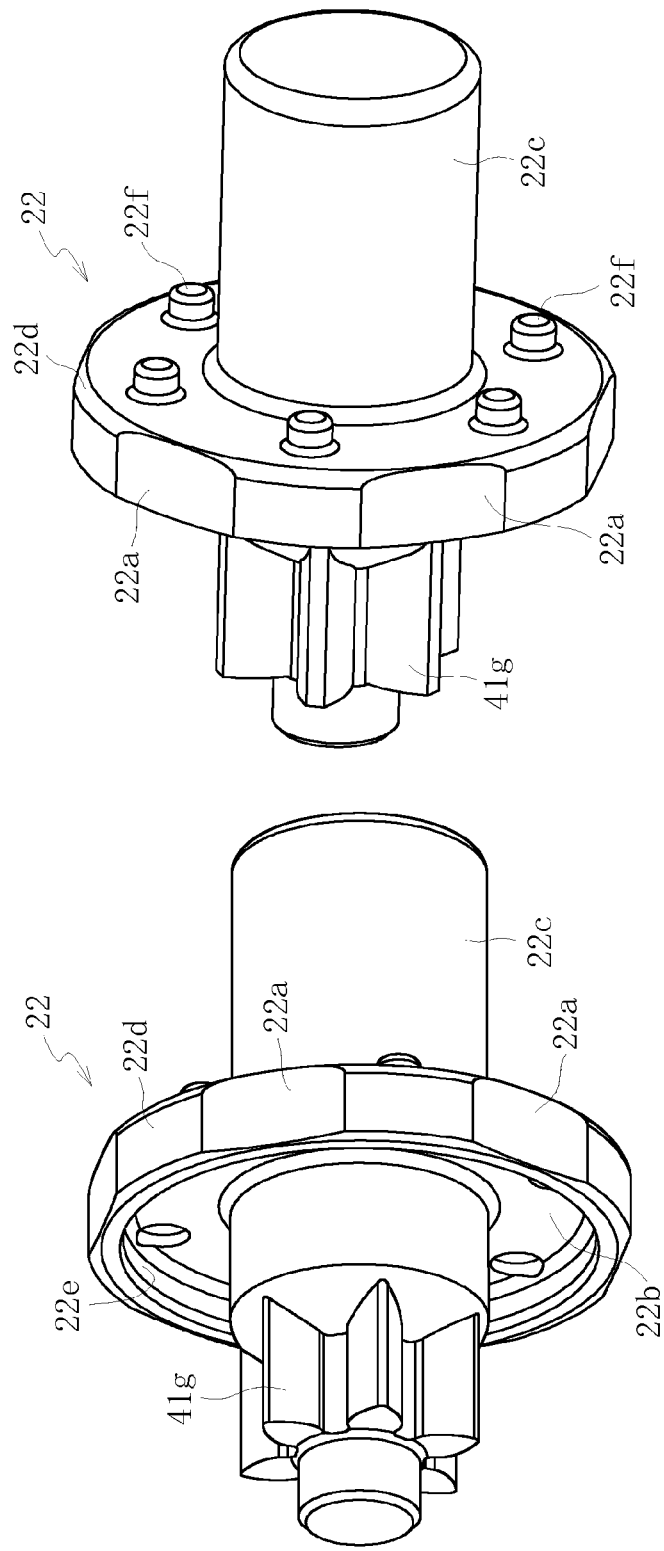

Fig. 15b
Fig. 15a
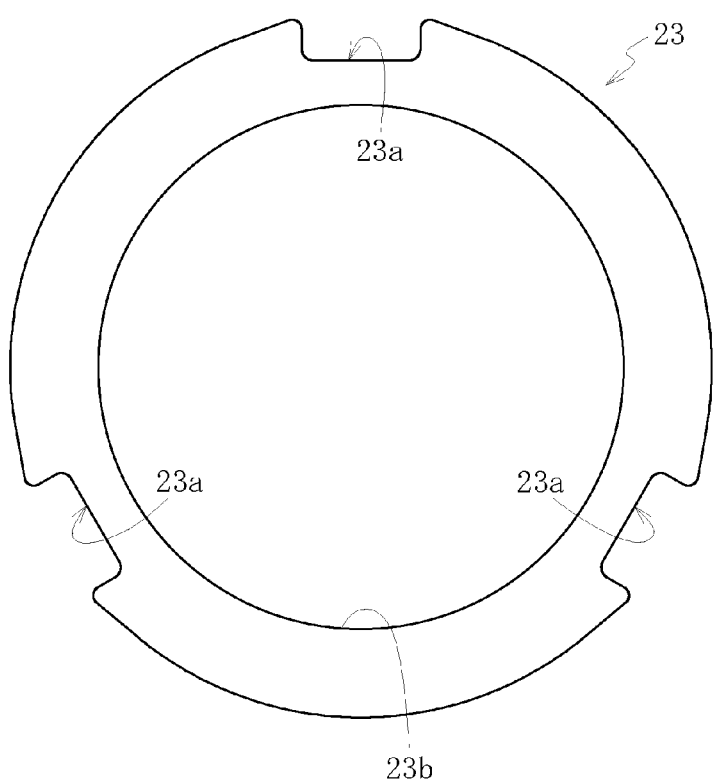
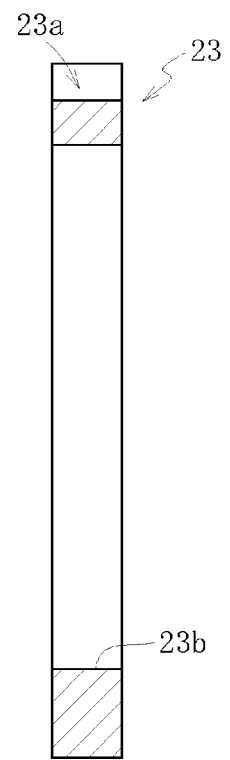

Fig. 17a
Fig. 17b
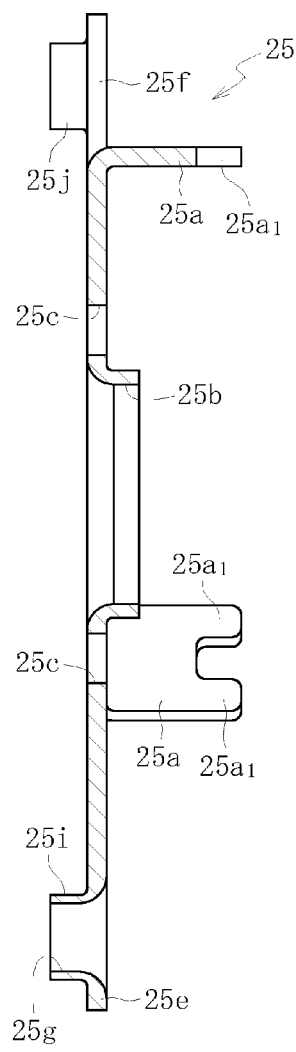
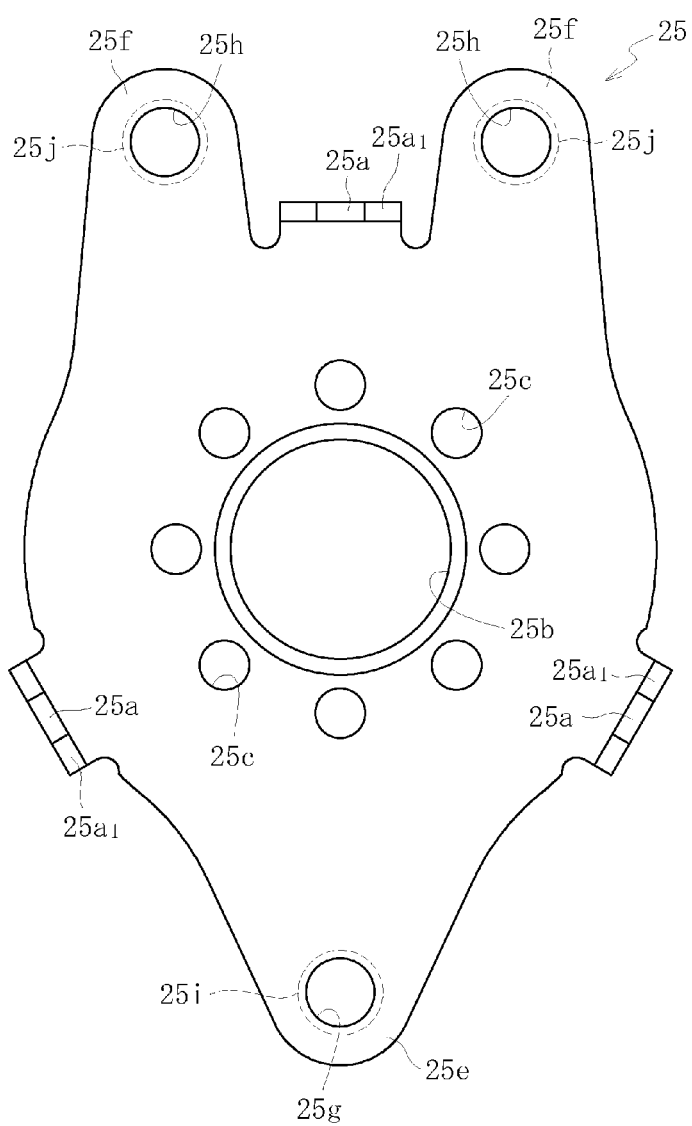

SPLIT POSITION

CLUTCH UNIT

TECHNICAL FIELD

The present invention relates to a clutch unit having a lever-side clutch portion for transmitting rotational torque from an input side to an output side thereof and a brake-side clutch portion for transmitting rotational torque from the input side to the output side and interrupting torque reversely input from the output side.

BACKGROUND ART

In general, in a clutch unit using engagement elements such as cylindrical rollers or balls, a clutch portion is arranged between an input-side member and an output-side member. Further, in the clutch portion, the engagement elements such as cylindrical rollers or balls are engaged and disengaged with respect to wedge gaps formed between the input-side member and the output-side member, thereby controlling transmission and interruption of the input torque.

The applicant of the present invention has previously proposed a clutch unit incorporated into, for example, an automobile seat-lifter section which vertically adjusts a seat through lever operation. This clutch unit is provided with a lever-side clutch portion for transmitting rotational torque from the input side to the output side and a brake-side clutch portion for transmitting rotational torque from the input side to the output side and interrupting torque reversely input from the output side (see, for example, Patent Literature 1).

FIG. 34 is a longitudinal sectional view of an overall structure of the conventional clutch unit disclosed in Patent Literature 1, FIG. 35 is a sectional view taken along the line D-D of FIG. 34, and FIG. 36 is a sectional view taken along the line E-E of FIG. 34.

As illustrated in FIGS. 34 and 35, a lever-side clutch portion 111 mainly includes a lever-side outer ring 114 serving as an input-side member to which torque is input through lever operation, an inner ring 115 serving as a coupling member for transmitting the torque from the lever-side outer ring 114 to a brake-side clutch portion 112, a plurality of cylindrical rollers 116 serving as engagement elements for controlling transmission and interruption of the torque input from the lever-side outer ring 114 through engagement and disengagement between the lever-side outer ring 114 and the inner ring 115, a retainer 117 for retaining the cylindrical rollers 116 at predetermined circumferential intervals, a brake-side outer ring 123 serving as a stationary-side member restricted in rotation, an inner centering spring 118 serving as a first elastic member which is provided between the retainer 117 and the brake-side outer ring 123, for accumulating an elastic force obtained by the torque input from the lever-side outer ring 114 and restoring the retainer 117 to a neutral state with the accumulated elastic force through releasing of the input torque, and an outer centering spring 119 serving as a second elastic member which is provided between the lever-side outer ring 114 and the brake-side outer ring 123, for accumulating an elastic force obtained by the torque input from the lever-side outer ring 114 and restoring the lever-side outer ring 114 to the neutral state with the accumulated elastic force through releasing of the input torque.

Note that, in the figures, reference numeral 113 represents a lever-side side plate fixed to the lever-side outer ring 114 by swaging and constituting the input-side member together with the lever-side outer ring 114, and reference numeral 131 represents a washer mounted to an output shaft 122 through the intermediation of a wave washer 130.

Meanwhile, as illustrated in FIGS. 34 and 36, the brake-side clutch portion 112 mainly includes the brake-side outer ring 123 serving as a stationary-side member restricted in rotation, the inner ring 115 serving as a coupling member to which torque from the lever-side clutch portion 111 is input, and a plurality of pairs of cylindrical rollers 127 serving as engagement elements arranged in wedge gaps between the brake-side outer ring 123 and the output shaft 122, for controlling transmission of torque input from the inner ring 115 and interruption of torque reversely input from the output shaft 122 through engagement and disengagement between the brake-side outer ring 123 and the output shaft 122.

A larger diameter portion 115c extending from an axial end portion of the inner ring 115 in a radially outer direction and bending in an axial direction functions as a retainer for retaining the cylindrical rollers 127 at predetermined circumferential intervals. In the figures, reference numerals 124 and 125 respectively represent a cover and a brake-side side plate constituting the stationary-side member together with the brake-side outer ring 123, and the brake-side outer ring 123 and the cover 124 are integrally fixed to each other with the brake-side side plate 125 by swaging. Reference numeral 128 represents a plate spring of, for example, an N-shaped sectional configuration arranged between the cylindrical rollers 127 of each pair, and reference numeral 129 represents a friction ring serving as a braking member mounted to the brake-side side plate 125.

CITATION LIST

[PTL1] JP 2009-210114 A

SUMMARY OF INVENTION

Technical Problems

By the way, the conventional clutch unit disclosed in Patent Literature 1 has the following structure. Specifically, the stationary-side member includes the brake-side outer ring 123, the cover 124, and the brake-side side plate 125, and the brake-side outer ring 123 and the cover 124 are integrally fixed to each other with the brake-side side plate 125 by swaging. The conventional clutch unit also has the following structure. Specifically, when the lever-side outer ring 114 is rotated through lever operation, the outer centering spring 119 accumulates an elastic force obtained by torque input from the lever-side outer ring 114, and restores the lever-side outer ring 114 to a neutral state with the accummulated elastic force through releasing of the input torque. The outer centering spring 119 is provided between the lever-side outer ring 114 and the cover 124 constituting the stationary-side member together with the brake-side outer ring 123. The outer centering spring 119 is held in abutment on the cover 124.

In a case of the clutch unit having the above-mentioned structure, at the time of lever operation of restoring a lever from a full stroke to a neutral position, the outer centering spring 119, which slides on the cover 124, may climb onto an inclined portion 124g of the cover 124 (see FIG. 34) and thus come into contact with the opposing lever-side outer ring 114. When the outer centering spring 119 climbs in this manner by sliding, the outer centering spring 119 comes into contact with the lever-side outer ring 114, with the result that slight noises occur. The noises bring a feeling of discomfort to a passenger who adjusts a seat vertically through lever operation.

Further, the conventional clutch unit has the following structure. Specifically, when the lever-side outer ring 114 is rotated through lever operation, the inner centering spring 118 accumulates an elastic force obtained by the input torque from the lever-side outer ring 114, and restores the retainer 117 to a neutral state with the accummulated elastic force through releasing of the input torque. The inner centering spring 118 is provided between the retainer 117 and the cover 124 constituting the stationary-side member together with the brake-side outer ring 123. The inner centering spring 118 is held in abutment on the cover 124.

In a case of the clutch unit having the above-mentioned structure, when the lever-side outer ring 114 is rotated through lever operation, the inner centering spring 118 for accumulating the elastic force obtained by the torque input from the lever-side outer ring 114 is extended, with the result that a radially outward force acting at the time of extension may disengage the inner centering spring 118 from the retainer 117.

Further, in the conventional clutch unit, the friction ring 129, which serves as a braking member fitted onto the brake-side side plate 125, is press-fitted to an annular recessed portion 122b of the output shaft 122 with a fastening allowance. Due to a frictional force generated between an inner peripheral surface 122e of the annular recessed portion 122b of the output shaft 122 and the friction ring 129 with the fastening allowance, rotational resistance is imparted to the output shaft 122 (see FIGS. 34 and 36).

However, when a material forming the friction ring 129 is degraded over time, it is difficult to keep the fastening allowance between the output shaft 122 and the friction ring 129. As a result, when excessive torque is applied to the output shaft 122, at the time of releasing a locked state of the brake-side clutch portion 112 through lever operation performed at the lever-side clutch portion 111, it is difficult for the friction ring 129 to impart predetermined rotational resistance to the output shaft 122 because of reduction in fastening allowance between the output shaft 122 and the friction ring 129. Accordingly, contact pressure of the cylindrical rollers 127 may be increased to cause occurrence of strong vibration. The vibration brings a feeling of discomfort to a passenger who adjusts a seat vertically through lever operation.

Therefore, the present invention has been proposed in view of the above-mentioned problems, and has an object to provide the following clutch unit. Specifically, the clutch unit is capable of forestalling occurrence of noises caused by contact of the outer centering spring with the lever-side outer ring at the time of lever operation, and forestalling disengagement of the inner centering spring from the retainer. In addition, the clutch unit is capable of suppressing reduction in fastening allowance of the friction ring over time.

Solution to Problems

A clutch unit according to the present invention comprises: a lever-side clutch portion provided on an input side, for controlling transmission and interruption of rotational torque to an output side through lever operation; and a brake-side clutch portion provided on the output side, for transmitting torque input from the lever-side clutch portion to the output side and for interrupting torque reversely input from the output side.

The lever-side clutch portion according to the present invention comprises: an input-side member to be rotated through the lever operation; a stationary-side member restricted in rotation; and an elastic member provided between the input-side member and the stationary-side member, for accumulating an elastic force obtained by torque input from the input-side member and for restoring the input-side member to a neutral state with the accumulated elastic force through releasing of the torque input from the input-side member.

In the clutch unit according to the present invention, the elastic member comprises a band plate-like spring member having a C-shape, the stationary-side member comprises an inclined portion which abuts on the elastic member and swells to the elastic member side, and under a state in which the elastic member is assembled, an inner diameter of the elastic member is arranged on an outer side of an outermost diameter of the inclined portion of the stationary-side member.

According to the present invention, under the state in which the elastic member is assembled, the inner diameter of the elastic member is arranged on the outer side of the outermost diameter of the inclined portion of the stationary-side member. Thus, at the time of lever operation of restoring a lever from a full stroke to a neutral position, it is possible to prevent the elastic member, which slides on the stationary-side member, from climbing onto the inclined portion of the stationary-side member, and to avoid contact of the elastic member with the input-side member. Accordingly, it is possible to prevent occurrence of noises.

According to the present invention, it is desired that the elastic member comprise a pair of lock portions formed by bending both ends thereof to a radially outer side, and under the state in which the elastic member is assembled, a distance between an inner diameter of a region of the elastic member, which is displaced by 180° from the pair of lock portions and the outermost diameter of the inclined portion of the stationary-side member be set larger than a distance between an inner diameter of a region of the elastic member, which is displaced by 90° from the pair of lock portions and the outermost diameter of the inclined portion of the stationary-side member. With this, at the time of lever operation, it is possible to reliably prevent the elastic member, which slides on the stationary-side member, from climbing onto the inclined portion of the stationary-side member.

According to the present invention, it is desired that, under the state in which the elastic member is assembled, an interval between distal ends of the pair of lock portions of the elastic member be set larger than an interval between proximal ends of the pair of lock portions of the elastic member. With this, a force acting on the elastic member is directed toward a center thereof by a reaction force acting on the pair of lock portions. Accordingly, at the time of lever operation, it is possible to further reliably prevent the elastic member, which slides on the stationary-side member, from climbing onto the inclined portion of the stationary-side member.

According to the present invention, it is desired that the inclined portion of the stationary-side member be formed into a cylindrical shape. With this, it is possible to further reliably prevent the elastic member, which is situated on the outer side of the inclined portion, from climbing onto the inclined portion.

Further, in the clutch unit according to the present invention, the elastic member comprises a C-shaped spring member which comprises a pair of lock portions formed by bending both ends thereof to a radially inner side, and under a state in which the elastic member is assembled, an interval between distal ends of the pair of lock portions of the elastic member is set smaller than an interval between proximal ends thereof.

According to the present invention, under the state in which the elastic member is assembled, the interval between the distal ends of the pair of lock portions of the elastic member is set smaller than the interval between the proximal ends thereof. Accordingly, even when the elastic member, which accumulates an elastic force obtained by torque input from the input-side member, is extended by rotating the input-side member through lever operation, a force acting on the lock portions of the elastic member is directed to a radially inner side, and hence it is possible to prevent the lock portions of the elastic member from being disengaged from the retainer.

According to the present invention, it is desired that under the state in which the elastic member is assembled, a minute gap be interposed between an inner diameter of the elastic member and an outer diameter of the retainer. With this, even if a radially outward force acts on the lock portions of the elastic member when the elastic member, which accumulates the elastic force obtained by the torque input from the input-side member, is extended at the time of lever operation, the inner diameter of the elastic member is brought into abutment on the outer diameter of the retainer so as to narrow the minute gap. Accordingly, it is possible to further reliably prevent the lock portions of the elastic member from being disengaged from the retainer.

According to the present invention, it is desired that under the state in which the elastic member is assembled, an inner diameter of a region of the elastic member, which is displaced by 180° from the pair of lock portions, be brought into abutment on the outer diameter of the retainer. With this, even if the radially outward force acts on the lock portions of the elastic member when the elastic member, which accumulates the elastic force obtained by the torque input from the input-side member, is extended at the time of lever operation, the inner diameter of the elastic member is brought into abutment on the outer diameter of the retainer. Accordingly, it is possible to still further reliably prevent the lock portions of the elastic member from being disengaged from the retainer.

In addition, in the clutch unit according to the present invention, the friction ring is made of a material capable of keeping a fastening allowance between the output-side member and the friction ring. As the material for the friction ring, polybutylene terephthalate (PBT) is preferred.

According to the present invention, the friction ring is made of a material, for example, polybutylene terephthalate, capable of keeping a fastening allowance between the output-side member and the friction ring, and hence reduction in fastening allowance of the friction ring over time can be easily suppressed. As a result, even when excessive torque is applied to the output-side member, at the time of releasing a locked state of the brake-side clutch portion through lever operation performed at the lever-side clutch portion, predetermined rotational resistance can be imparted to the output-side member. Accordingly, it is possible to prevent occurrence of strong vibration caused by an increase in contact pressure of the cylindrical rollers.

According to the present invention, it is desired that the friction ring have an inner diameter formed into a circular shape. With this, it is possible to increase rigidity of the friction ring, and to increase durability of the entire clutch unit.

According to the present invention, it is desired that the friction ring be press-fitted to an annular recessed portion formed in the output-side member, and the annular recessed portion comprise a chamfered portion formed on a peripheral edge portion thereof, the chamfered portion having a chamfer angle of 20° to 25°. With this, when the friction ring is press-fitted to the annular recessed portion of the output-side member, it is possible to smoothly press-fit the friction ring to the annular recessed portion, and to prevent occurrence of burrs.

The lever-side clutch portion in the clutch unit may comprise: an input-side member to which torque is input through the lever operation; a coupling member for transmitting the torque input from the input-side member to the brake-side clutch portion; a plurality of engagement elements for controlling transmission and interruption of the torque input from the input-side member through engagement and disengagement between the input-side member and the coupling member; a retainer for retaining the plurality of engagement elements at predetermined intervals in a circumferential direction; a stationary-side member restricted in rotation; a first elastic member provided between the retainer and the stationary-side member, for accumulating an elastic force obtained by the torque input from the input-side member and for restoring the retainer to a neutral state with the accumulated elastic force through releasing of the torque input from the input-side member; and a second elastic member provided between the input-side member and the stationary-side member, for accumulating an elastic force by the torque input from the input-side member and for restoring the input-side member to a neutral state with the accumulated elastic force through releasing of the torque input from the input-side member. It is desired that cylindrical rollers be used for the engagement elements of the lever-side clutch portion.

The brake-side clutch portion in the clutch unit may comprise: a coupling member to which torque is input from the lever-side clutch portion; an output-side member from which the torque is output; a stationary-side member restricted in rotation; and a plurality of pairs of engagement elements arranged in wedge gaps between the stationary-side member and the output-side member, for controlling transmission of the torque input from the coupling member and interruption of the torque reversely input from the output-side member through engagement and disengagement between the stationary-side member and the output-side member. It is desired that cylindrical rollers be used for the engagement elements of the brake-side clutch portion.

In the clutch unit according to the present invention, the lever-side clutch portion and the brake-side clutch portion are incorporated in an automobile seat-lifter section. Thus, the clutch unit is suited for use in an automobile. In this case, the clutch unit has a configuration in which the input-side member is connected to an operation lever and the output-side member is coupled to a link mechanism of the automobile seat-lifter section.

Advantageous Effects of Invention

According to the present invention, under the state in which the elastic member is assembled, the inner diameter of the elastic member is arranged on the outer side of the outermost diameter of the inclined portion of the stationary-side member. Thus, at the time of lever operation of restoring the lever from a full stroke to a neutral position, it is possible to prevent the elastic member, which slides on the stationary-side member, from climbing onto the inclined portion of the stationary-side member, and to avoid contact of the elastic member with the input-side member. Accordingly, it is possible to prevent the occurrence of noises. As a result, in a case where the clutch unit is incorporated into the automobile seat-lifter section, lever operation of adjusting a seat vertically is performed satisfactorily, and hence comfortable lever operation can be realized.

According to the present invention, under the state in which the elastic member is assembled, the interval between the distal ends of the pair of lock portions of the elastic member is set smaller than the interval between the proximal ends thereof. Accordingly, even when the elastic member, which accumulates an elastic force obtained by torque input from the input-side member, is extended by rotating the input-side member through lever operation, a force acting on the lock portions of the elastic member is directed to a radially inner side, and hence it is possible to prevent the lock portions of the elastic member from being disengaged from the retainer. Therefore, it is possible to provide a clutch unit with a long life and high reliability.

Further, according to the present invention, the friction ring is made of a material, for example, polybutylene terephthalate, capable of keeping the fastening allowance between the output-side member and the friction ring, and hence reduction in fastening allowance of the friction ring over time can be easily suppressed. As a result, even when excessive torque is applied to the output-side member, at the time of releasing a locked state of the brake-side clutch portion through lever operation performed at the lever-side clutch portion, predetermined rotational resistance can be imparted to the output-side member. Accordingly, it is possible to prevent occurrence of strong vibration caused by the increase in contact pressure of the cylindrical rollers. As a result, in a case where the clutch unit is incorporated into the automobile seat-lifter section, lever operation of adjusting a seat vertically is performed satisfactorily, and hence comfortable lever operation can be realized.

BRIEF DESCRIPTION OF DRAWINGS

FIG. 6a A sectional view of a lever-side side plate.
FIG. 6b A left-hand side view of FIG. 6a.
FIG. 7a A sectional view illustrating an example of a lever-side outer ring.
FIG. 7b A left-hand side view of FIG. 7a.
FIG. 7c A right-hand side view of FIG. 7a.
FIG. 8b A left-hand side view of FIG. 8a.
FIG. 10b A left-hand side view of FIG. 10a.
FIG. 10c A sectional view of FIG. 10a.
FIG. 11b A right-hand side view of FIG. 11a.
FIG. 12b A partially enlarged bottom view of FIG. 12a.
FIG. 13a A perspective view of an output shaft seen from one side.
FIG. 13b A perspective view of the output shaft seen from another side.
FIG. 14b A left-hand side view of FIG. 14a.
FIG. 14c A right-hand side view of FIG. 14a.
FIG. 15a A sectional view of a brake-side outer ring.
FIG. 15b A left-hand side view of FIG. 15a.
FIG. 16b A left-hand side view of FIG. 16a.
FIG. 17a A sectional view of a brake-side side plate.
FIG. 17b A right-hand side view of FIG. 17a.
FIG. 18b A left-hand side view of FIG. 18a.
FIG. 18c A right-hand side view of FIG. 18a.

FIG. 33b An enlarged view of a main part of FIG. 33a.

DESCRIPTION OF EMBODIMENTS

Figure 1:
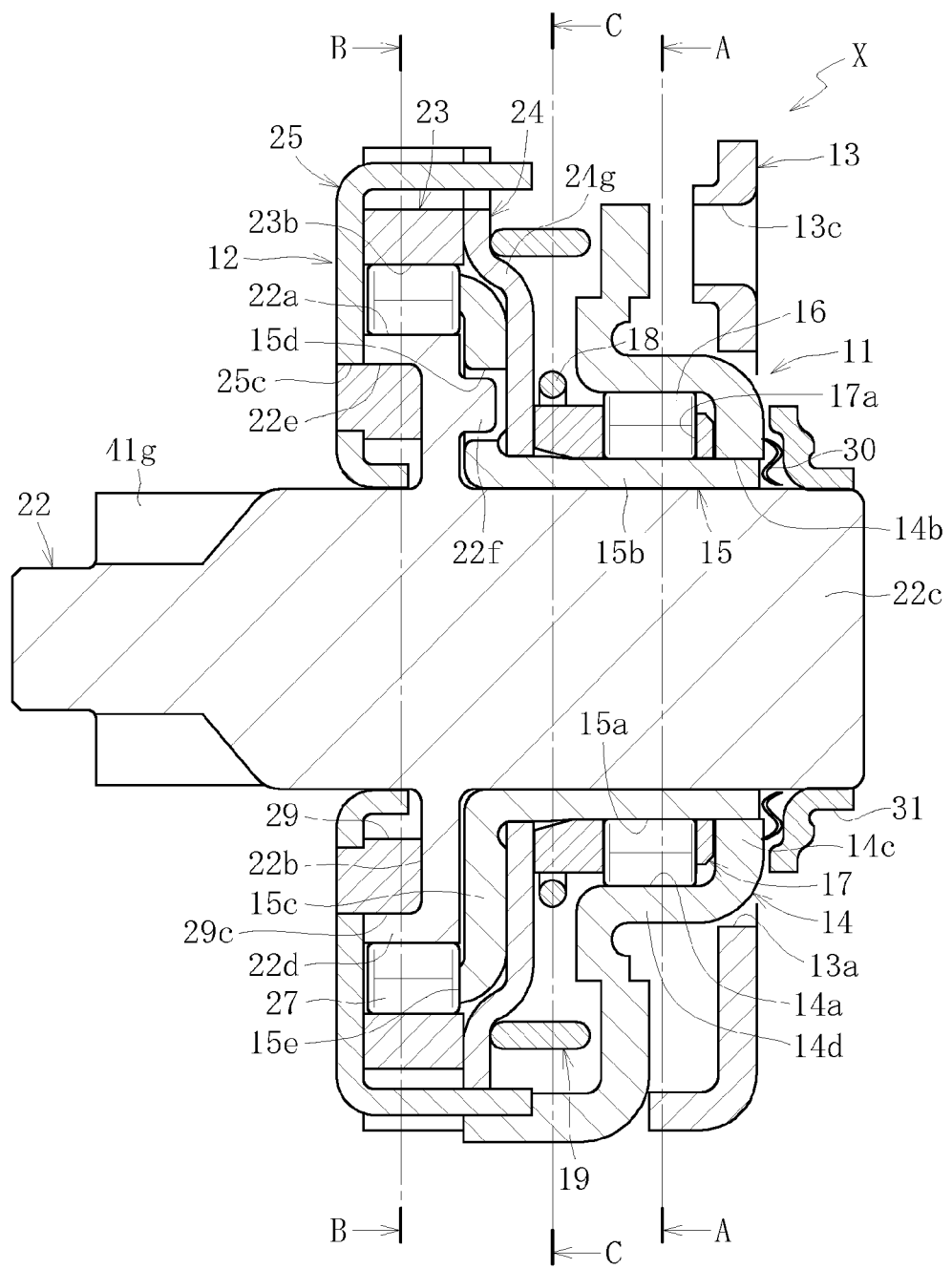
FIG. 1 A longitudinal sectional view of an overall structure of a clutch unit according to an embodiment of the present invention.
Figure 2:
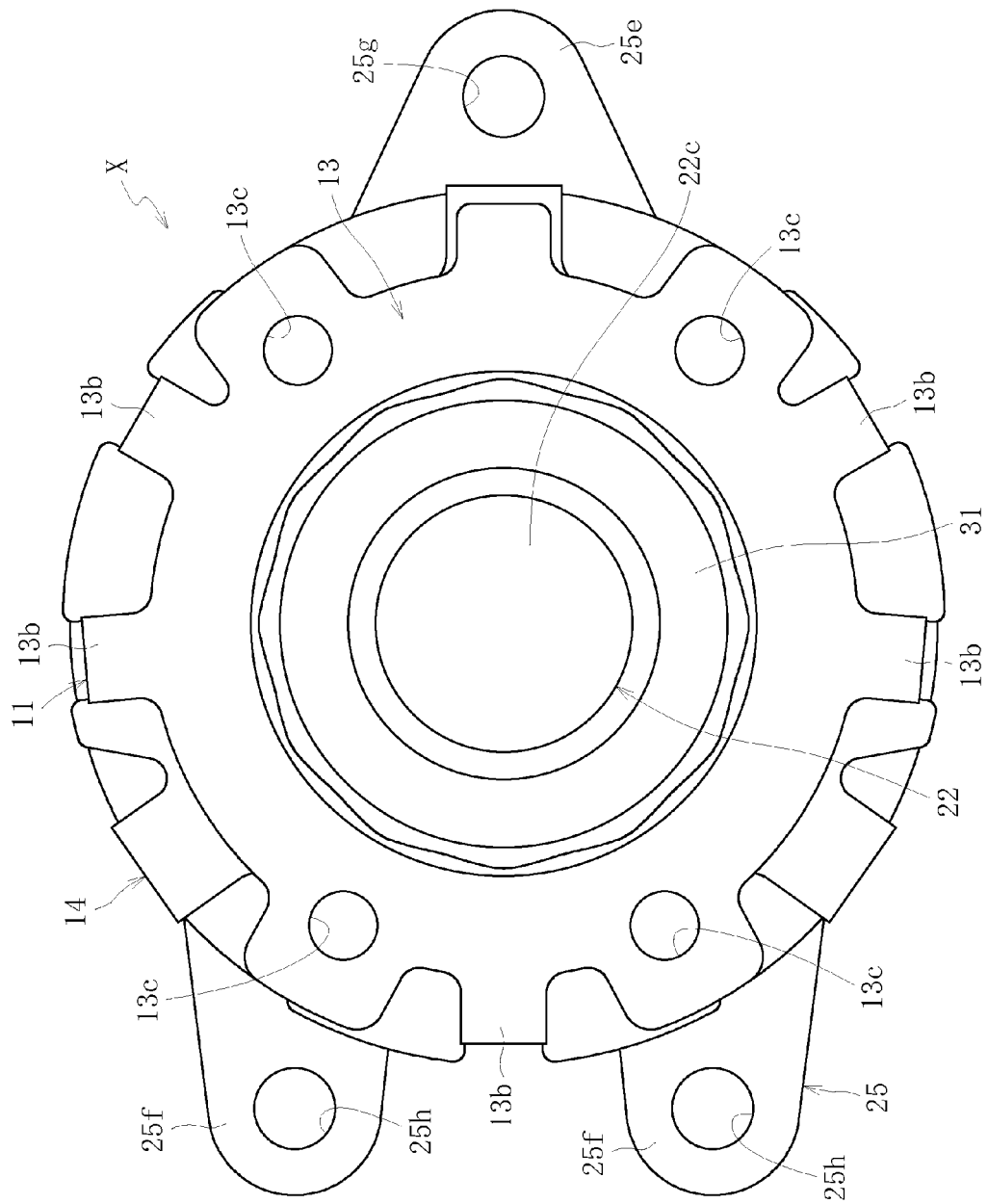
FIG. 2 A right-hand side view of FIG. 1.
Figure 3:
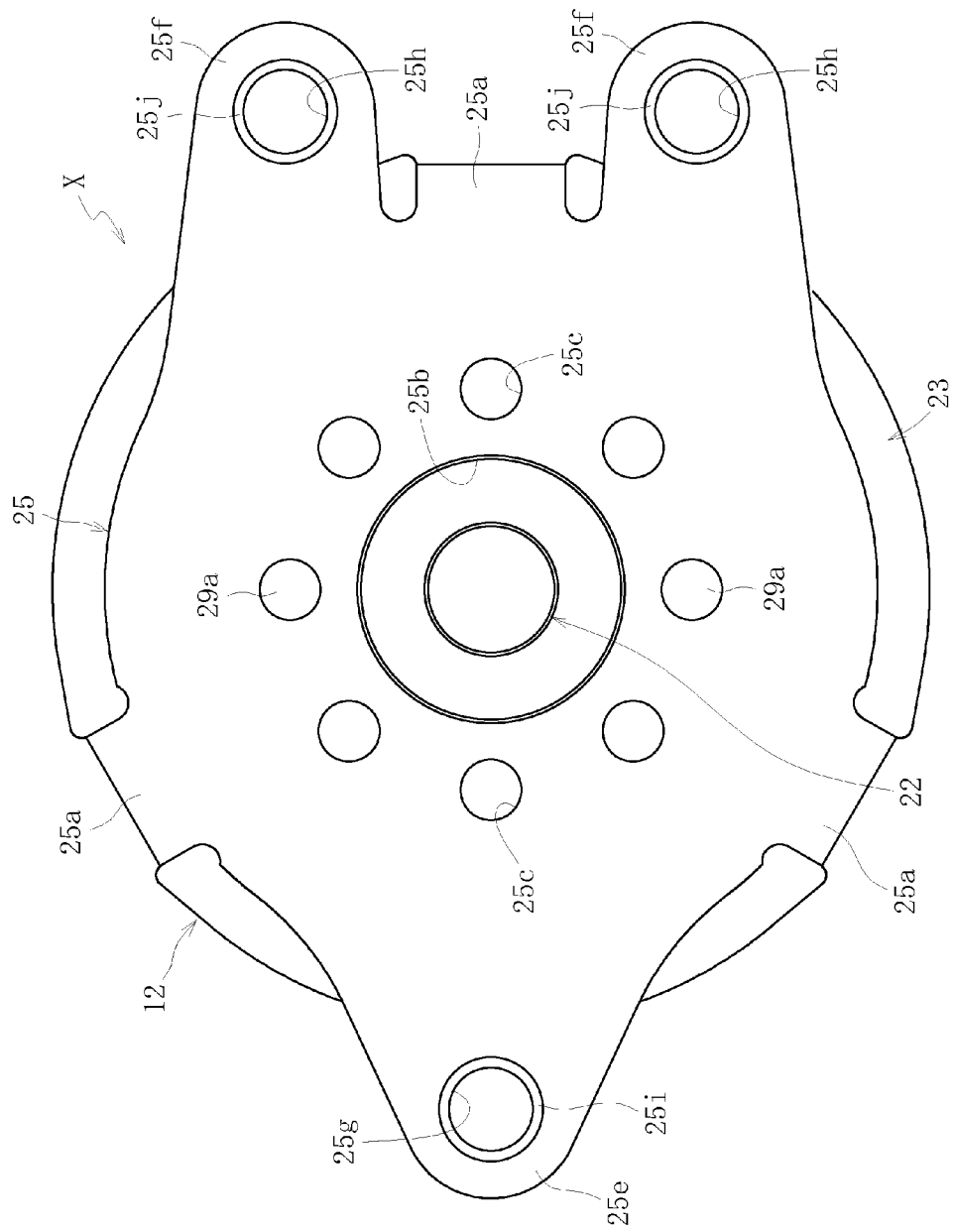
FIG. 3 A left-hand side view of FIG. 1.
Figure 4:
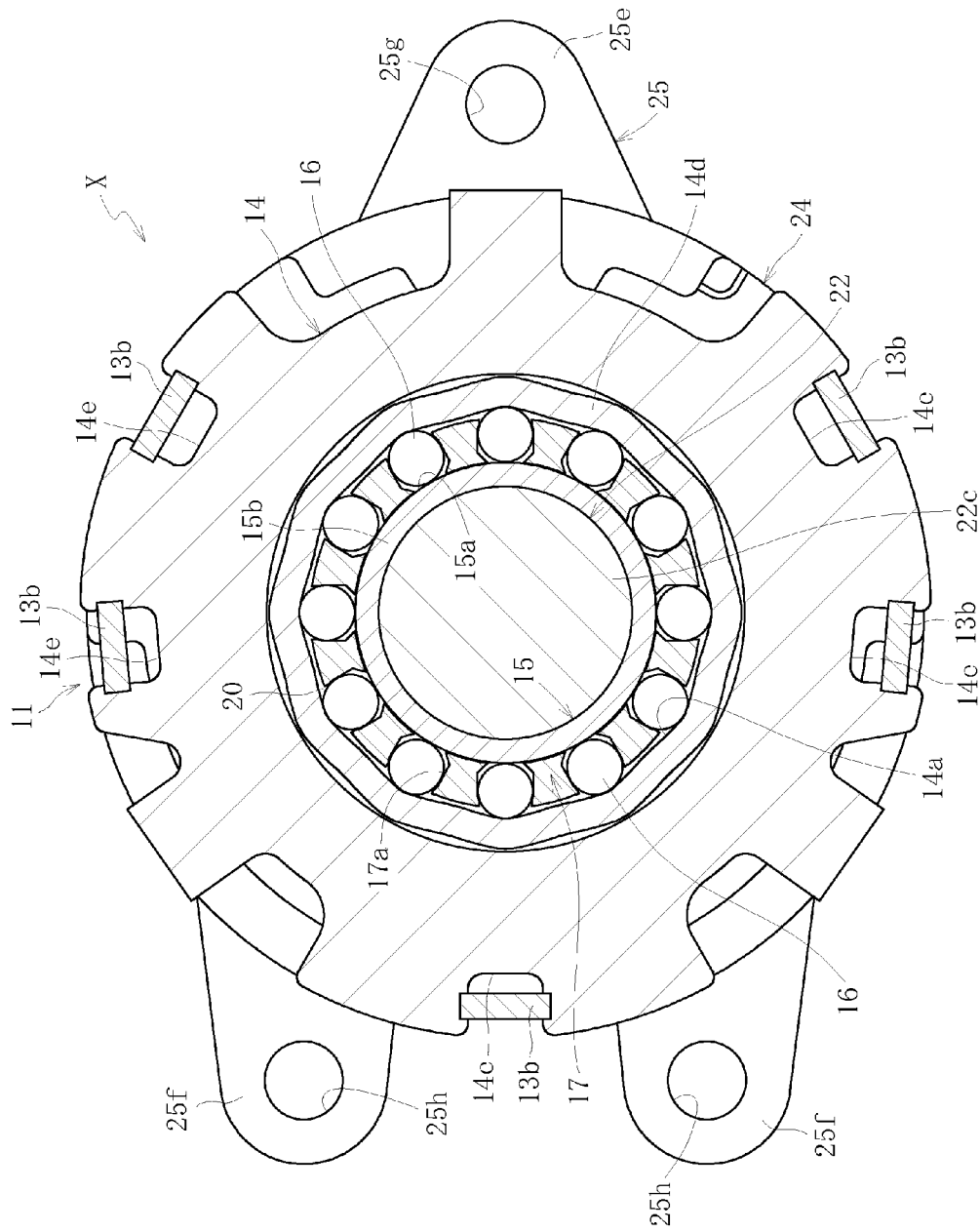
FIG. 4 A sectional view taken along the line A-A of FIG. 1.
Figure 5:
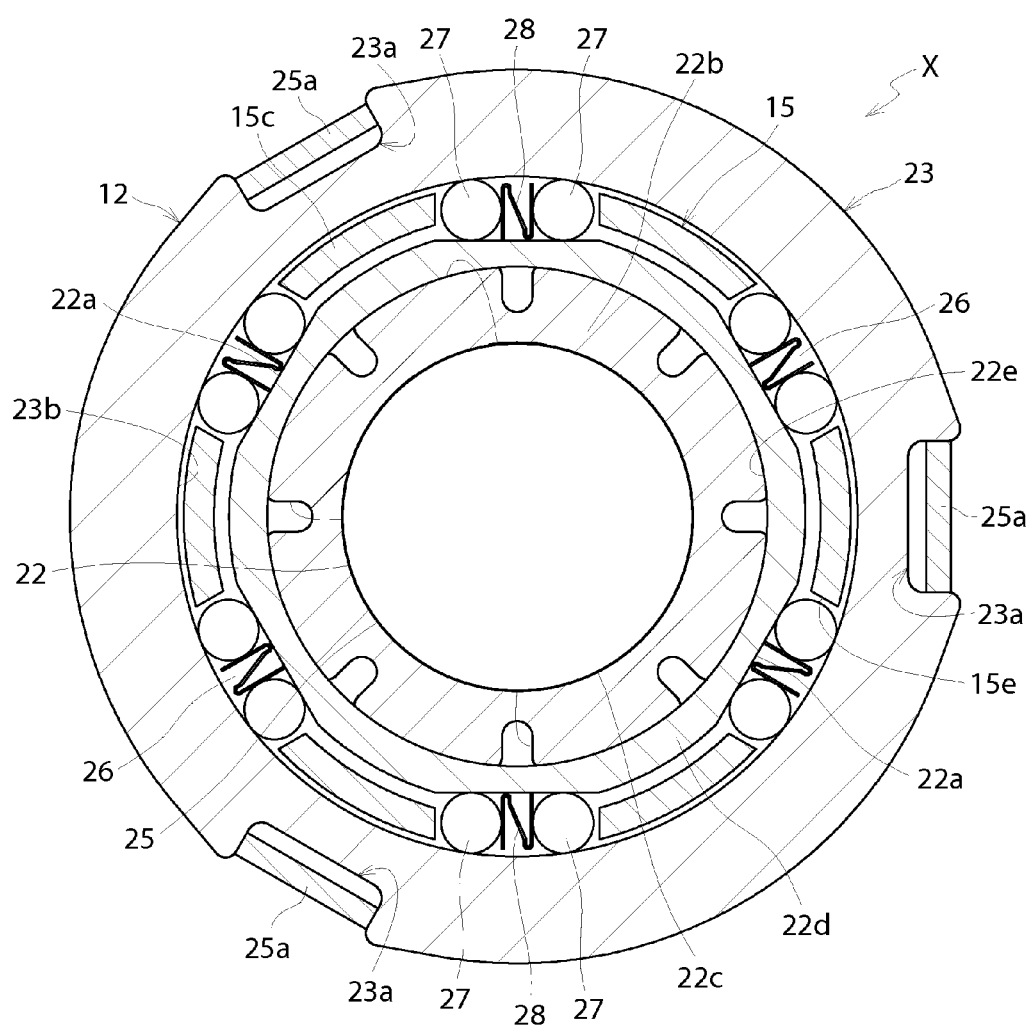
FIG. 5 A sectional view taken along the line B-B of FIG. 1.

FIG. 1 is a longitudinal sectional view of an overall structure of a clutch unit X according to an embodiment of the present invention. FIG. 2 is a right-hand side view of the clutch unit X illustrated in FIG. 1. FIG. 3 is a left-hand side view of the clutch unit X illustrated in FIG. 1. FIG. 4 is a lateral sectional view taken along the line A-A of FIG. 1. FIG. 5 is a lateral sectional view taken along the line B-B of FIG. 1. Further, FIGS. 6 to 18 illustrate main components of the clutch unit X. FIGS. 19 to 31 illustrate assembled states of the main components of the clutch unit X.

The clutch unit X is incorporated into an automobile seat-lifter section (see FIGS. 32, 33a, and 33b) for adjusting a height of a seat through lever operation or the like. As illustrated in FIGS. 1 to 5, the clutch unit X comprises a unit of a lever-side clutch portion 11 provided on an input side and a brake-side clutch portion 12 which is provided on an output side and which has a function of interrupting reverse input.

As illustrated in FIGS. 1, 2, and 4, the lever-side clutch portion 11 comprises a lever-side side plate 13 and a lever-side outer ring 14 each serving as an input-side member to which an operation lever (not shown) or the like is connected, an inner ring 15 serving as a coupling member which transmits torque from the lever-side outer ring 14 to the brake-side clutch portion 12, a plurality of cylindrical rollers 16 arranged as engagement elements in wedge gaps 20 formed between an outer peripheral surface 15a of the inner ring 15 and an inner peripheral surface 14a of the lever-side outer ring 14, a retainer 17 for retaining the cylindrical rollers 16 equiangularly, an inner centering spring 18 as a first elastic member for restoring the retainer 17 to a neutral state, and an outer centering spring 19 as a second elastic member for restoring the lever-side outer ring 14 to a neutral state. Note that, components are prevented from being detached by press-fitting a washer 31 onto an end portion of an output shaft 22 described later through intermediation of a wave washer 30 (see FIG. 1).

As illustrated in FIGS. 1, 3, and 5, the so-called lock type brake-side clutch portion 12 which has a function of interrupting reverse input mainly comprises the inner ring 15 serving as a coupling member to which the torque from the lever-side clutch portion 11 is input, the output shaft 22 serving as an output-side member, a brake-side outer ring 23, a cover 24, and a brake-side side plate 25 each serving as a stationary-side member restricted in rotation, a plurality of pairs of cylindrical rollers 27 arranged as coupling members in wedge gaps 26 between the brake-side outer ring 23 and the output shaft 22, for controlling transmission of the torque input from the inner ring 15 and interruption of the torque reversely input from the output shaft 22 through engagement and disengagement between both members, and plate springs 28 of, for example, an N-shaped sectional configuration, each provided between the cylindrical rollers 27 of each pair and serving as elastic members for imparting repulsive force to the cylindrical rollers 27. Note that, protrusions 22f are provided to the output shaft 22 and inserted into holes 15d with clearances, which are provided to the inner ring 15 (see FIG. 1).

Next, detailed description is made of main components of the lever-side clutch portion 11 and the brake-side clutch portion 12 which are provided in the clutch unit X.

FIGS. 6a and 6b illustrate the lever-side side plate 13 of the lever-side clutch portion 11. In the lever-side side plate 13, a hole 13a into which the output shaft 22 and the inner ring 15 are inserted is formed in a center portion thereof, and a plurality of (five, for example) claw portions 13b are provided in a protruding manner on an outer peripheral portion thereof. Those claw portions 13b are bent and molded in an axial direction so as to have bisected distal ends. Then, the claw portions 13b are inserted into cutout recessed portions 14e (see FIG. 7c) of the lever-side outer ring 14, which are described later. Lastly, the distance between each of the bisected distal ends is increased outward. In this manner, the lever-side side plate 13 is fixed to the lever-side outer ring 14 by swaging. Note that, in the figures, a plurality of (four, for example) holes for mounting the operation lever (not shown) for adjusting a height of a seat to the lever-side side plate 13 are represented by reference symbol 13c.

FIGS. 7a to 7c illustrate the lever-side outer ring 14. The lever-side outer ring 14 is obtained by molding a plate-like material into a cup-shape through press working, and comprises a hole 14b formed in a center portion 14c, through which the output shaft 22 and the inner ring 15 are inserted. On an inner periphery of a cylindrical portion 14d extending from the center portion 14c in the axial direction, a plurality of cam surfaces 14a are equiangularly formed (see FIG. 4).

On an outer peripheral portion of the lever-side outer ring 14, a plurality of (three, for example) claw portions 14f and 14g are provided in a protruding manner and bent and molded in the axial direction. Of those claw portions 14f and 14g, the one claw portion 14f is locked by being inserted and arranged between two lock portions 19a (see FIG. 12a) of the outer centering spring 19 described later. In a state of being in contact with an end surface of the brake-side outer ring 23 described later, the other two claw portions 14g slide on the end surface of the brake-side outer ring 23 in accordance with rotation of the lever-side outer ring 14, and move between a pair of lock portions 24e and 24f (see FIG. 16b) as rotation stoppers provided on an outer periphery of the cover 24 so as to be abuttable on the lock portion 24e and 24f, respectively, at moving ends in a rotational direction. In this manner, an operating angle of the operation lever is restricted.

The plurality of (five in the figure) cutout recessed portions 14e into which the claw portions 13b (see FIGS. 6a and 6b) of the lever-side side plate 13 are inserted are formed on an outer periphery of the lever-side outer ring 14. By swaging the claw portions 13b of the lever-side side plate 13, which are inserted into the cutout recessed portions 14e, the lever-side side plate 13 and the lever-side outer ring 14 are connected to each other. The lever-side outer ring 14 and the lever-side side plate 13 fixed by swaging to the lever-side outer ring 14 constitute the input-side member of the lever-side clutch portion 11.

Figure 8B:
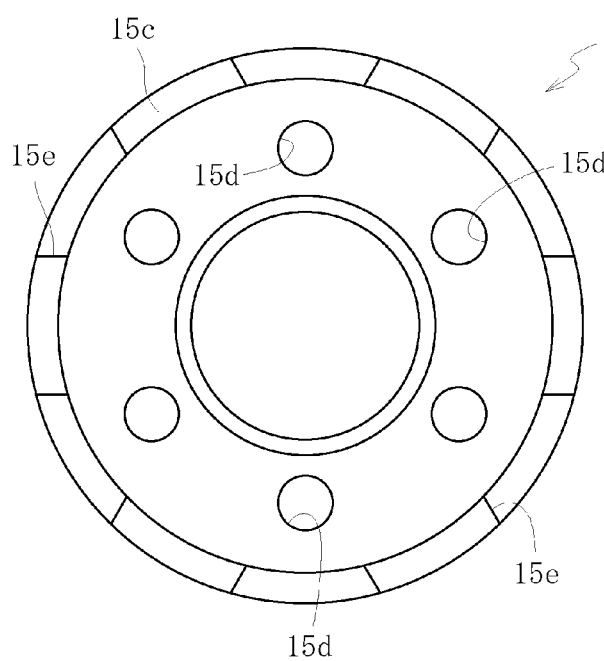
Figure 8A:
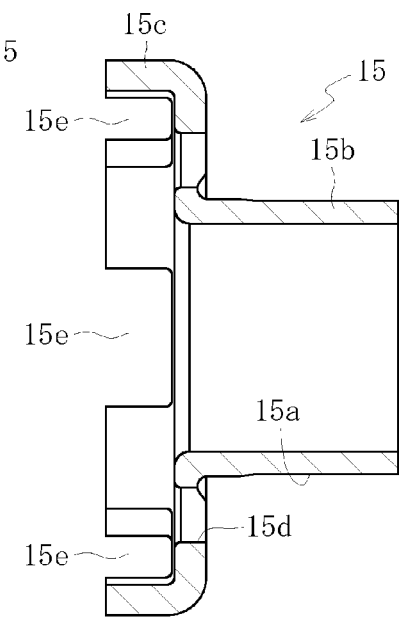
FIG. 8a A sectional view of an inner ring.
Figure 9:
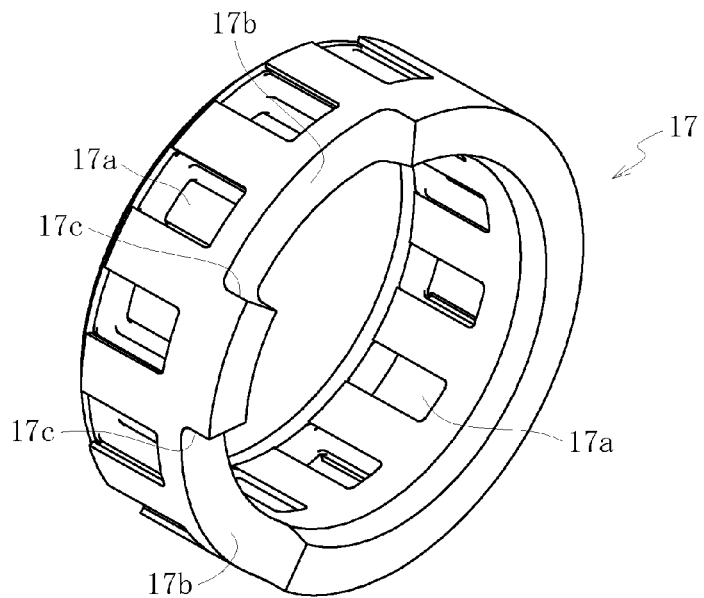
FIG. 9 A perspective view of a retainer.
Figure 10C:
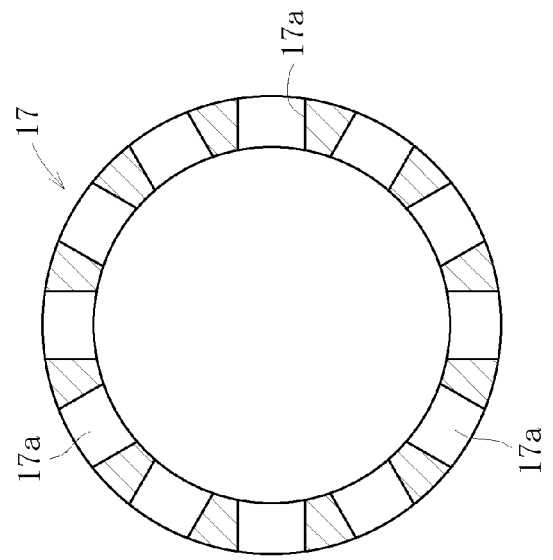
Figure 10A:
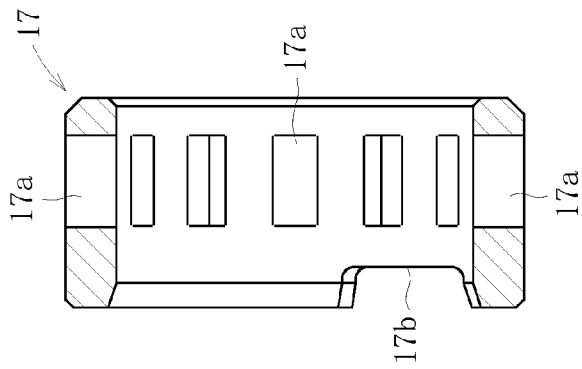
FIG. 10a A sectional view of the retainer.
Figure 10B:
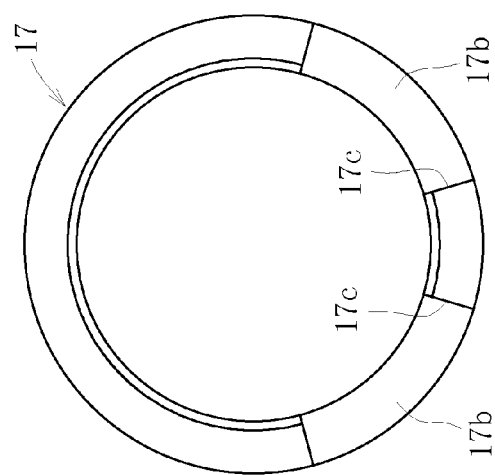

FIGS. 8a and 8b illustrate the inner ring 15. The inner ring 15 is provided with the outer peripheral surface 15a formed on an outer diameter of a cylindrical portion 15b into which the output shaft 22 is inserted, the wedge gaps 20 (see FIG. 4) being formed between the outer peripheral surface 15a and the cam surfaces 14a of the lever-side outer ring 14. Further, a larger diameter portion 15c extending from an end portion of the cylindrical portion 15b in a radially outer direction and bending in the axial direction is integrally formed. In order to cause a larger diameter portion 15c to function as a retainer for the brake-side clutch portion 12, pockets 15e for accommodating the cylindrical rollers 27 and the plate springs 28 are equiangularly formed in the larger diameter portion 15c. Note that, in the figures, a plurality of holes into which the protrusions 22f of the output shaft 22 (see FIG. 1) are inserted with clearances are represented by a reference symbol 15d.

FIGS. 9, and 10a to 10e illustrate the retainer 17 made of a resin. The retainer 17 is a cylindrical member in which a plurality of pockets 17a for accommodating the cylindrical rollers 16 are equiangularly formed. Two cutout recessed portions 17b are formed in one end portion of the retainer 17, and lock portions 18a of the above-mentioned inner centering spring 18 are locked to adjacent two end surfaces 17c of the respective cutout recessed portions 17b (see FIG. 30).

Figure 11A:
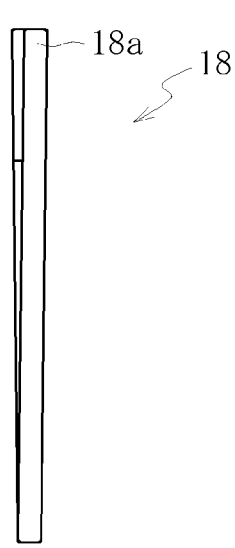
FIG. 11a A front view of an inner centering spring.
Figure 11B:
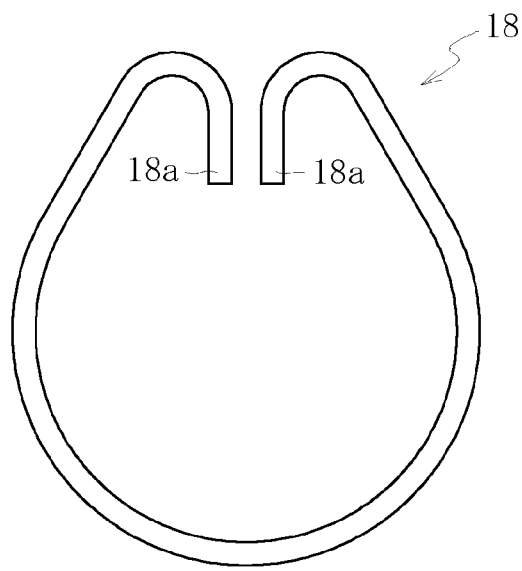

FIGS. 11a and 11b illustrate the inner centering spring 18. The inner centering spring 18 is a spring member having a circular C-shape in cross-section and including a pair of the lock portions 18a bent to a radially inner side, and is situated on the radially inner side of the outer centering spring 19 (see FIG. 30). The inner centering spring 18 is arranged between the retainer 17 and the cover 24 serving as a stationary-side member of the brake-side clutch portion 12. In addition, both the lock portions 18a are locked to the two end surfaces 17c (see FIGS. 9 and 10b) of the retainer 17 and locked to a claw portion 24b (see FIGS. 16a and 16b) provided to the cover 24 (see FIGS. 30, 31a and 31b).

At the time of application of torque input from the lever-side outer ring 14 in the inner centering spring 18, one of the lock portions 18a is engaged with one of the end surfaces 17c of the retainer 17, and the other of the lock portions 18a is engaged with the claw portion 24b of the cover 24. Thus, the inner centering spring 18 is pressed and extended in accordance with rotation of the lever-side outer ring 14 so as to accumulate an elastic force. At the time of releasing the torque input from the lever-side outer ring 14, the retainer 17 is restored to a neutral state with the elastic restoring force.

When the inner centering spring 18 is pressed and extended in accordance with rotation of the lever-side outer ring 14 at the time of lever operation, a radially outward force acts on one of the lock portions 18a which is engaged with one of the end surfaces 17c of the retainer 17. Accordingly, the one of the lock portions 18a may be disengaged from the one of the end surfaces 17c of the retainer 17, and hence the inner centering spring 18 is set into the following form.

Figure 19:
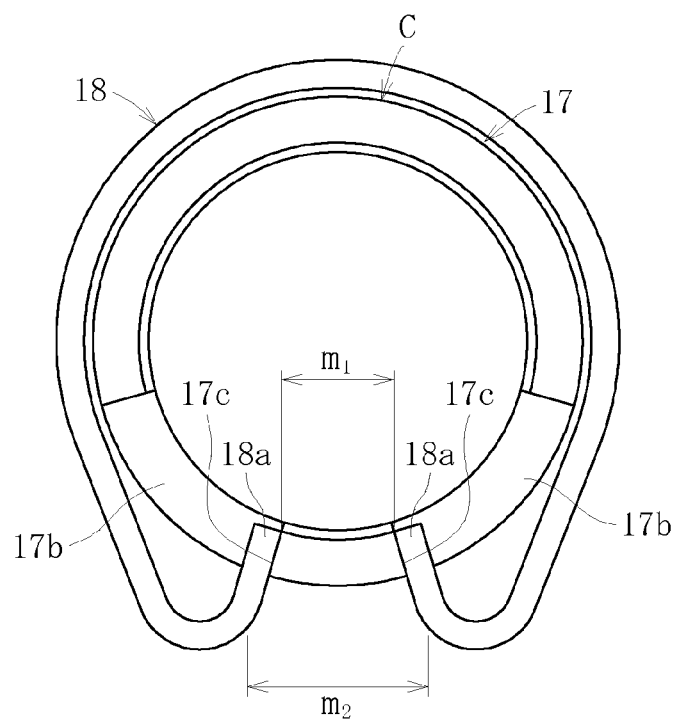
FIG. 19 A side view illustrating an example in which the inner centering spring is assembled to the retainer.

As means for forestalling disengagement of the lock portion 18a of the inner centering spring 18 from the retainer 17, as illustrated in FIG. 19, an interval $m_1$ between distal ends of the pair of lock portions 18a is set smaller than an interval $m_2$ between proximal ends of the pair of lock portions 18a ($m_1 < m_2$) under a state in which the inner centering spring 18 is assembled to the retainer 17, i.e., a state in which the pair of lock portions 18a are engaged with the end surfaces 17c of the retainer 17. That is, setting the interval $m_1$ between the distal ends of the pair of lock portions 18a of the inner centering spring 18 smaller than the interval $m_2$ between the proximal ends thereof means closing the pair of lock portions 18a to a radially inner side.

Thus, the interval $m_1$ between the distal ends of the pair of lock portions 18a of the inner centering spring 18 is set smaller than the interval $m_2$ between the proximal ends thereof, and hence a force acting on the inner centering spring 18 is directed toward a center thereof by a reaction force acting on the pair of lock portions 18a. Accordingly, even when the inner centering spring 18, which accumulates an elastic force obtained by the torque input from the lever-side outer ring 14, is extended by rotating the lever-side outer ring 14 through lever operation, a force acting on the lock portions 18a of the inner centering spring 18 is directed to a radially inner side, and hence it is possible to prevent the lock portions 18a of the inner centering spring 18 from being disengaged from the end surfaces 17c of the retainer 17.

Further, under a state in which the inner centering spring 18 is assembled, as illustrated in FIG. 19, a minute gap "c" is interposed between an inner diameter of the inner centering spring 18 and an outer diameter of the retainer 17. Thus, the minute gap "c" is interposed between the inner diameter of the inner centering spring 18 and the outer diameter of the retainer 17, and hence even if the radially outward force acts on the lock portion 18a of the inner centering spring 18 when the inner centering spring 18, which accumulates the elastic force obtained by the torque input from the lever-side outer ring 14, is extended at the time of lever operation, the inner diameter of the inner centering spring 18 is brought into abutment on the outer diameter of the retainer 17 so as to narrow the minute gap "c". Accordingly, it is possible to further reliably prevent the lock portions 18a of the inner centering spring 18 from being disengaged from the end surfaces 17c of the retainer 17.

Figure 20:
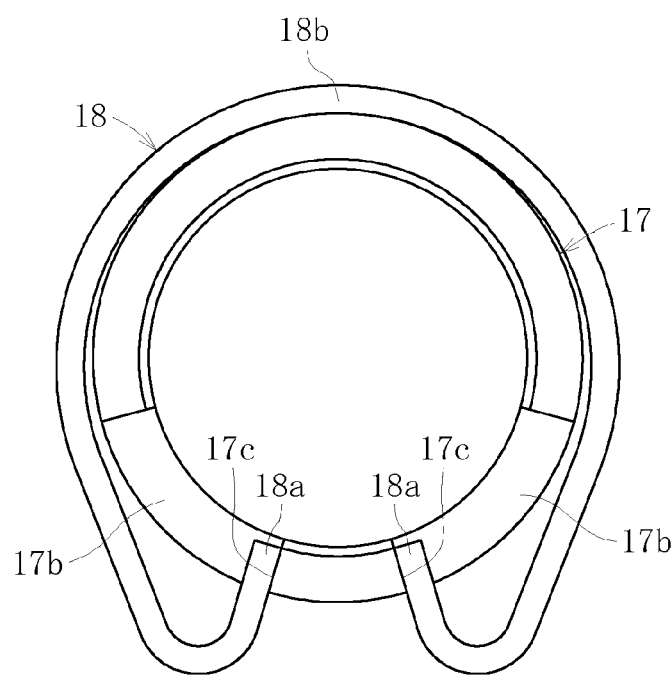
FIG. 20 A side view illustrating another example in which the inner centering spring is assembled to the retainer.

Still further, under a state in which the inner centering spring 18 is assembled, as illustrated in FIG. 20, it is effective that an inner diameter of a region 18b displaced by 180° from the pair of lock portions 18a is brought into abutment on the outer diameter of the retainer 17. Thus, the inner diameter of the region 18b displaced by 180° from the pair of lock portions 18a is brought into abutment on the outer diameter of the retainer 17, and hence even if the radially outward force acts on the lock portion 18a of the inner centering spring 18 when the inner centering spring 18, which accumulates the elastic force obtained by the torque input from the lever-side outer ring 14, is extended at the time of lever operation, the inner diameter of the inner centering spring 18 is brought into abutment on the outer diameter of the retainer 17. Accordingly, it is possible to still further reliably prevent the lock portions 18a of the inner centering spring 18 from being disengaged from the end surfaces 17c of the retainer 17.

Figure 12A:
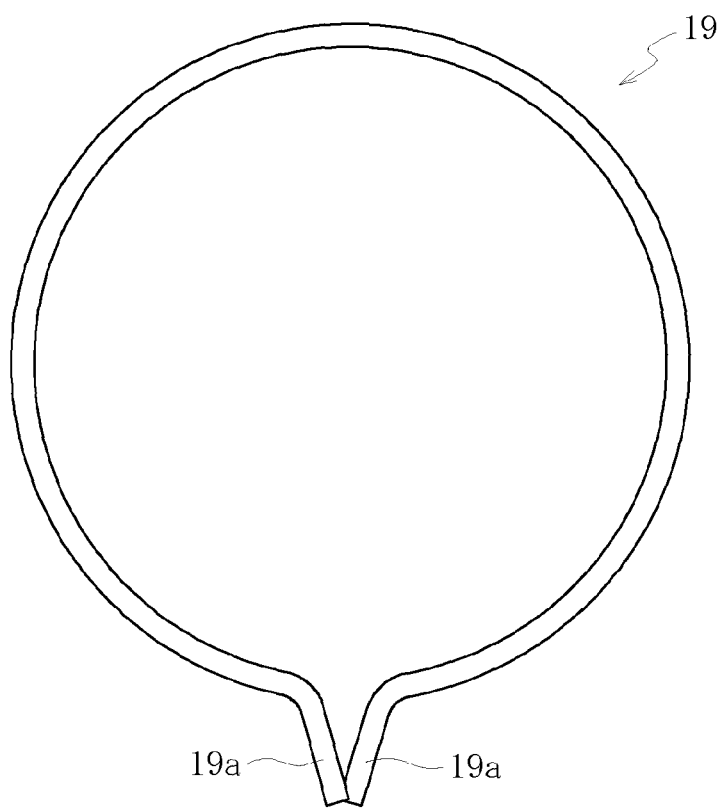
FIG. 12a A side view of an outer centering spring.
Figure 12B:
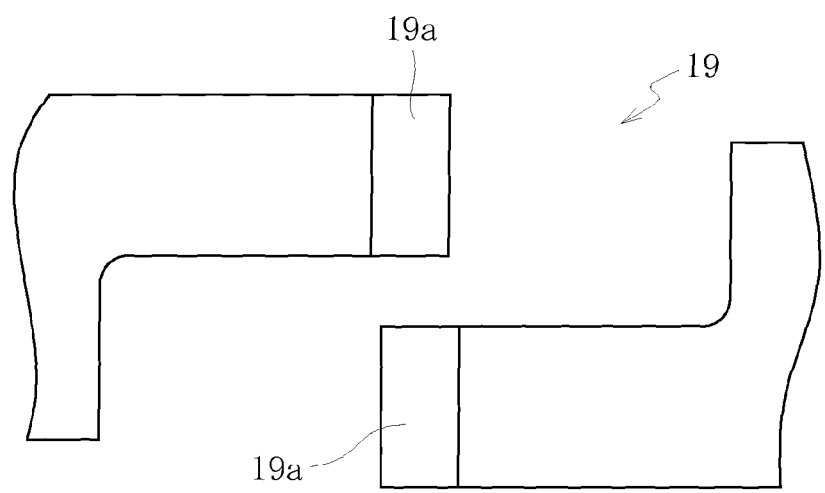

FIGS. 12a and 12b illustrate the outer centering spring 19. The outer centering spring 19 is a band plate-like spring member having a C-shape and the pair of lock portions 19a formed by bending both the ends thereof to a radially outer side, and is situated on a radially outer side of the inner centering spring 18 (see FIG. 30). The outer centering spring 19 is arranged between the lever-side outer ring 14 of the lever-side clutch portion 11 and the cover 24 of the brake-side clutch portion 12. Both the lock portions 19a are locked to the claw portion 14f (see FIGS. 7a to 7c) provided to the lever-side outer ring 14, and also locked to a claw portion 24d (see FIGS. 16a and 16b) provided to the cover 24 (see FIGS. 31a and 31b). The lock portions 19a are arranged while being displaced (by 180°) in a circumferential direction with respect to the lock portions 18a of the inner centering spring 18 (see FIG. 30).

In the outer centering spring 19, when the torque input from the lever-side side plate 13 is applied through lever operation so as to rotate the lever-side outer ring 14, one of the lock portions 19a is engaged with the claw portion 14f of the lever-side outer ring 14, and the other of the lock portions 19a is engaged with the claw portion 24d of the cover 24, respectively. Thus, the outer centering spring 19 is pressed and extended in accordance with the rotation of the lever-side outer ring 14 so as to accumulate an elastic force. When the torque input from the lever-side outer ring 14 is released, the lever-side outer ring 14 is restored to a neutral state with the elastic restoring force.

The outer centering spring 19 is provided between the cover 24 and the lever-side outer ring 14, and has such structure as to abut on the cover 24. Here, at the time of lever operation of restoring a lever from a full stroke to a neutral position, the outer centering spring 19, which slides on the cover 24, climbs onto an inclined portion 24g of the cover 24 and thus comes into contact with the opposing lever-side outer ring 14. As a result, slight noises occur. Accordingly, the outer centering spring 19 is set into the following form.

Figure 21:
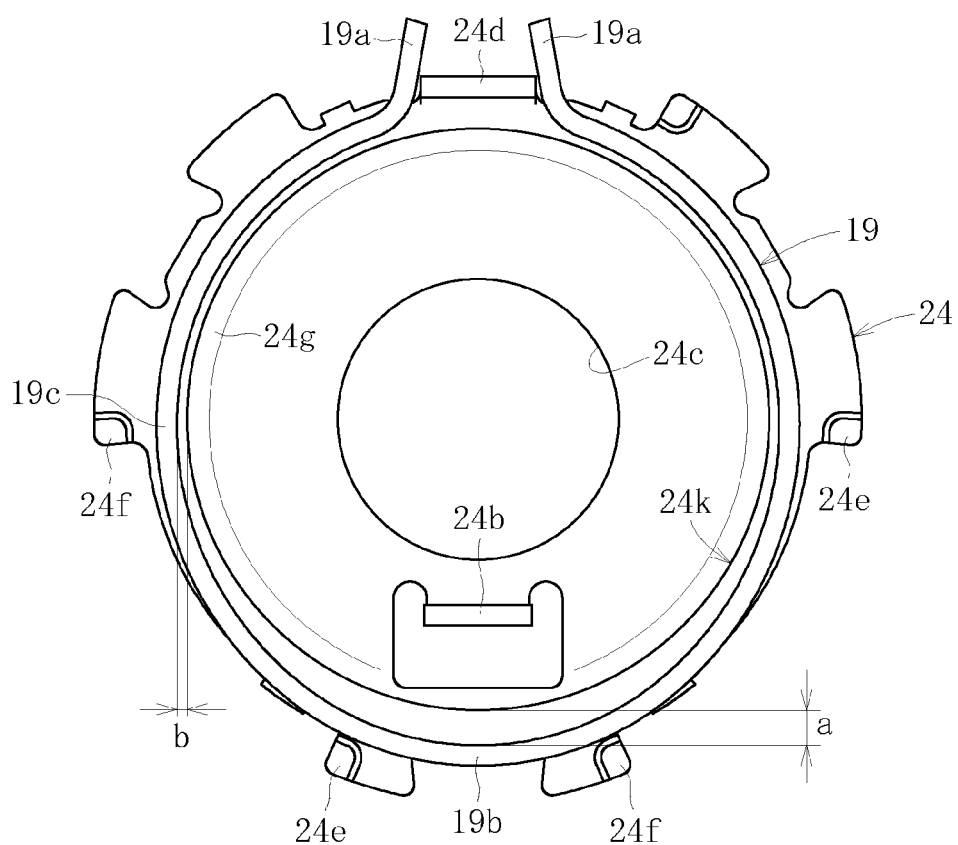
FIG. 21 A side view illustrating the outer centering spring and the cover.
Figure 22:
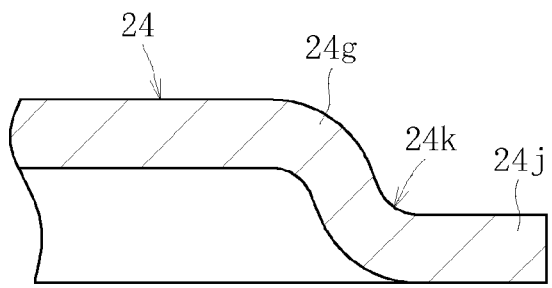
FIG. 22 A partially enlarged sectional view illustrating the cover.

As a form for forestalling the occurrence of the noises, as illustrated in FIG. 21, under a state in which the outer centering spring 19 is assembled to the cover 24, the inner diameter of the outer centering spring 19 is arranged on an outer side of an outermost diameter of the inclined portion 24g of the cover 24. Here, as illustrated in FIG. 22, the outermost diameter of the inclined portion 24g means a boundary portion 24k situated between the inclined portion 24g and a bottom portion 24j extending outward from the inclined portion 24g of the cover 24.

Thus, the inner diameter of the outer centering spring 19 is arranged on the outer side of the outermost diameter of the inclined portion 24g of the cover 24, and hence when operating the lever from a neutral position, the outer centering spring 19 is extended to the radially outer side. Accordingly, at the time of lever operation of restoring the lever from a full stroke to a neutral position, it is possible to prevent the outer centering spring 19, which slides on the cover 24, from climbing onto the inclined portion 24g of the cover 24, and it is possible to avoid contact of the outer centering spring 19 with the lever-side outer ring 14. Therefore, it is possible to prevent the occurrence of the noises.

Further, as illustrated in FIG. 21, it is effective that a distance "a" between an inner diameter of a region 19b displaced by 180° from the pair of lock portions 19a and the outermost diameter (boundary portion 24k) of the inclined portion 24g of the cover 24 is set larger than a distance "b" between an inner diameter of a region 19c displaced by 90° from the pair of lock portions 19a and the outermost diameter (boundary portion 24k) of the inclined portion 24g of the cover 24 (a>b). The distances "a" and "b" are set in this manner, and hence even at the region 19b at which the outer centering spring 19 is moved by a relatively small amount at the time of lever operation, the distance can be reliably ensured. Accordingly, at the time of lever operation, it is possible to reliably prevent the outer centering spring 19, which slides on the cover 24, from climbing onto the inclined portion 24g of the cover 24.

Figure 23:
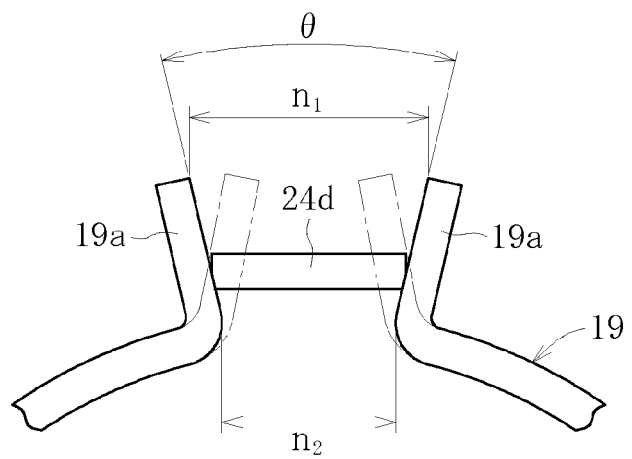
FIG. 23 A partially enlarged side view illustrating the outer centering spring and a claw portion of the cover.

In addition, as illustrated in FIG. 23, it is effective that an interval $n_1$ between distal ends of the pair of lock portions 19a of the outer centering spring 19 is set larger than an interval $n_2$ between proximal ends of the pair of lock portions 19a ($n_1 > n_2$). That is, setting the interval $n_1$ between the distal ends of the pair of lock portions 19a of the outer centering spring 19 larger than the interval $n_2$ between the proximal ends thereof means extending the pair of lock portions 19a outward. Note that, it is preferred that an extension angle θ of the pair of lock portions 19a be about 20°.

Thus, the interval $n_1$ between the distal ends of the pair of lock portions 19a of the outer centering spring 19 is set larger than the interval $n_2$ between the proximal ends thereof, and hence a force acting on the outer centering spring 19 is directed toward the center thereof by a reaction force acting on the pair of lock portions 19a. Accordingly, at the time of lever operation, it is possible to further reliably prevent the outer centering spring 19, which slides on the cover 24, from climbing onto the inclined portion 24g of the cover 24.

Figure 24:
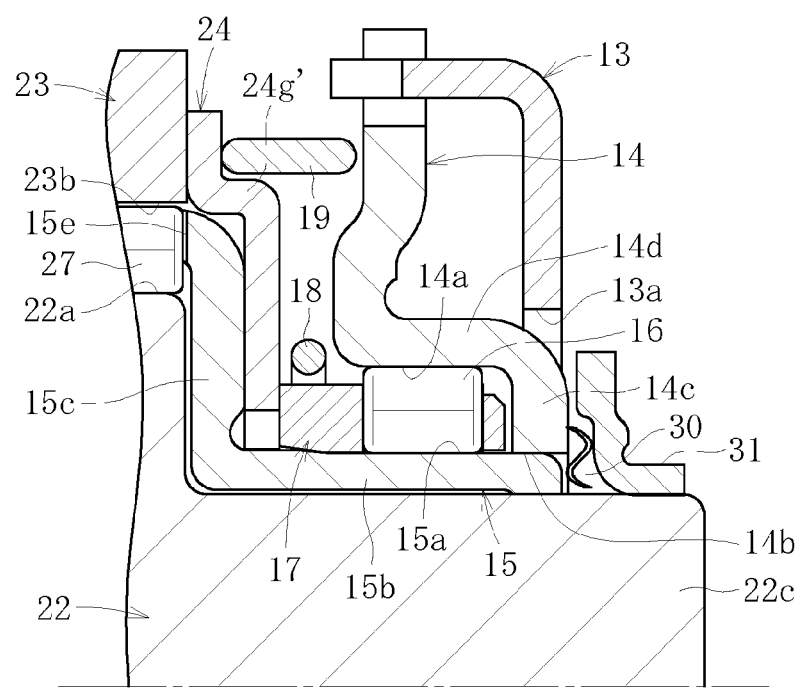
FIG. 24 A partially enlarged sectional view illustrating an embodiment in which an inclined portion of the cover is formed into a cylindrical shape.

Note that, as illustrated in FIG. 24, it is effective that an inclined portion 24g' of the cover 24 is formed into a cylindrical shape. Thus, the inclined portion 24g' of the cover 24 is formed into a cylindrical shape, and hence the inclined portion 24g' having a cylindrical shape forms a step. Accordingly, it is possible to further reliably prevent the outer centering spring 19, which is situated on the outer side of the inclined portion 24g of the cover 24, from climbing onto the inclined portion 24g.

FIGS. 13a and 13b and FIGS. 14a to 14c illustrate the output shaft 22. The output shaft 22 comprises a larger diameter portion 22d which extends from a shaft portion 22c to the radially outer side to be increased in diameter, and is integrally formed substantially in an axial center region of the output shaft 22. A pinion gear 41g to be coupled to a seat-lifter section 41 is coaxially formed on a distal end of the shaft portion 22c.

A plurality of (six, for example) flat cam surfaces 22a are equiangularly formed on an outer peripheral surface of the larger diameter portion 22d, and the two cylindrical rollers 27 and the plate spring 28 are arranged in each wedge gap 26 (see FIG. 5) provided between the cam surfaces 22a and an inner peripheral surface 23b of the brake-side outer ring 23. In one end surface of the larger diameter portion 22d, there is formed an annular recessed portion 22b in which a friction ring 29 is accommodated and arranged. Further, in the figures, protrusions formed on the other end surface of the larger diameter portion 22d are represented by reference symbol 22f, the protrusions being inserted into the holes 15d of the inner ring 15 with clearances (see FIGS. 1, 8a, and 8b).

Figure 16B:
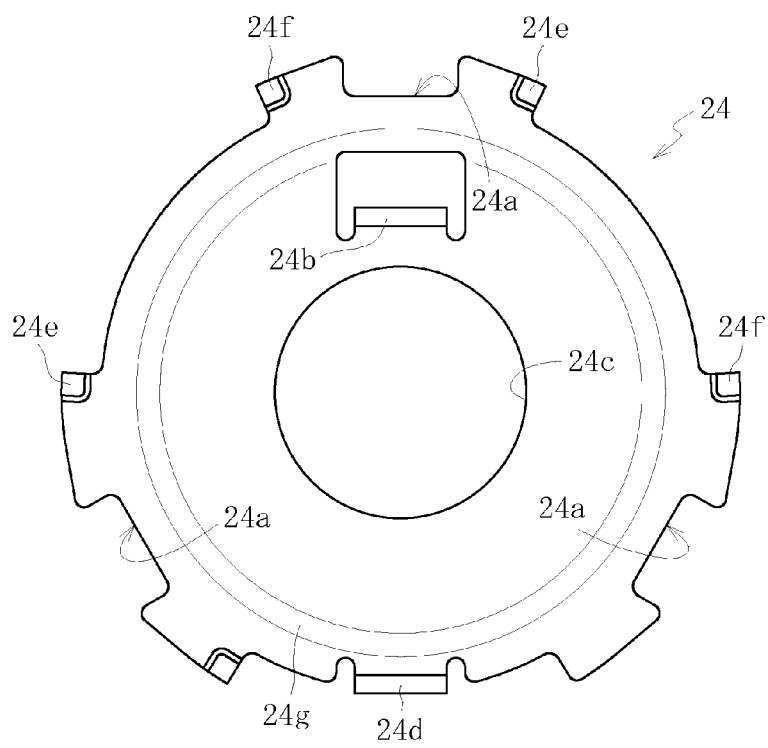
Figure 16A:
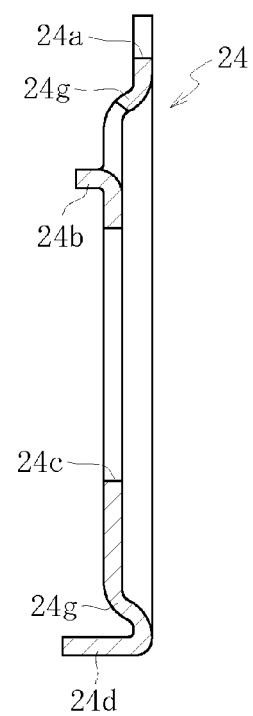
FIG. 16a A sectional view of a cover.

FIGS. 15a and 15b illustrate the brake-side outer ring 23, and FIGS. 16a and 16b illustrate the cover 24. FIGS. 17a and 17b illustrate the brake-side side plate 25. The brake-side outer ring 23 and the cover 24 described above are integrally fixed to each other with the brake-side side plate 25 by swaging. The brake-side outer ring 23 is formed of a thick plate-like member obtained by punching of a single material with a press, and the cover 24 is molded by pressing of another single material. As illustrated in FIGS. 16a and 16b, the cover 24 has the inclined portion 24g, which extends to the radially outer side in a state of abutting on the larger diameter portion 15c of the inner ring 15 described above (see FIG. 1). Note that, in the figures, holes into which the output shaft 22 is inserted are represented by reference symbols 24c and 25b, and holes with which protrusions 29a of the friction ring 29 described later are fitted are represented by reference symbol 25c.

Figure 27A:
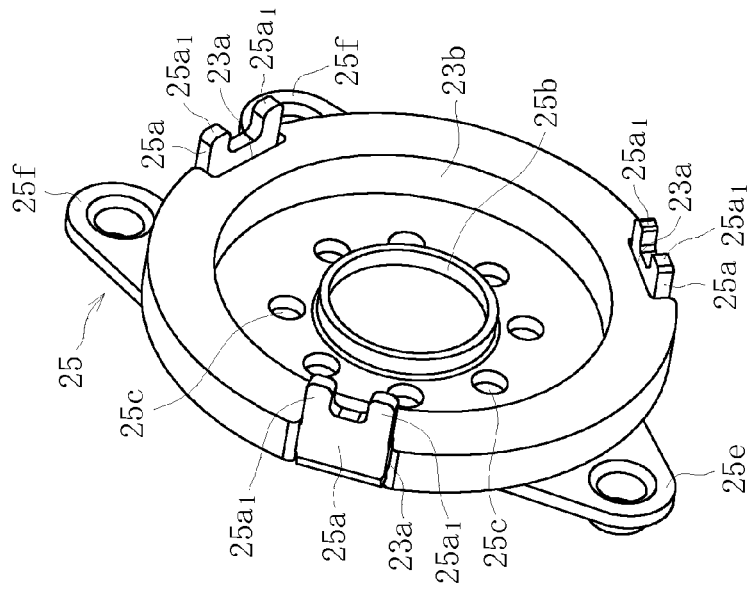
FIG. 27a A perspective view illustrating a state before the brake-side outer ring is assembled to the brake-side side plate.
Figure 27B:
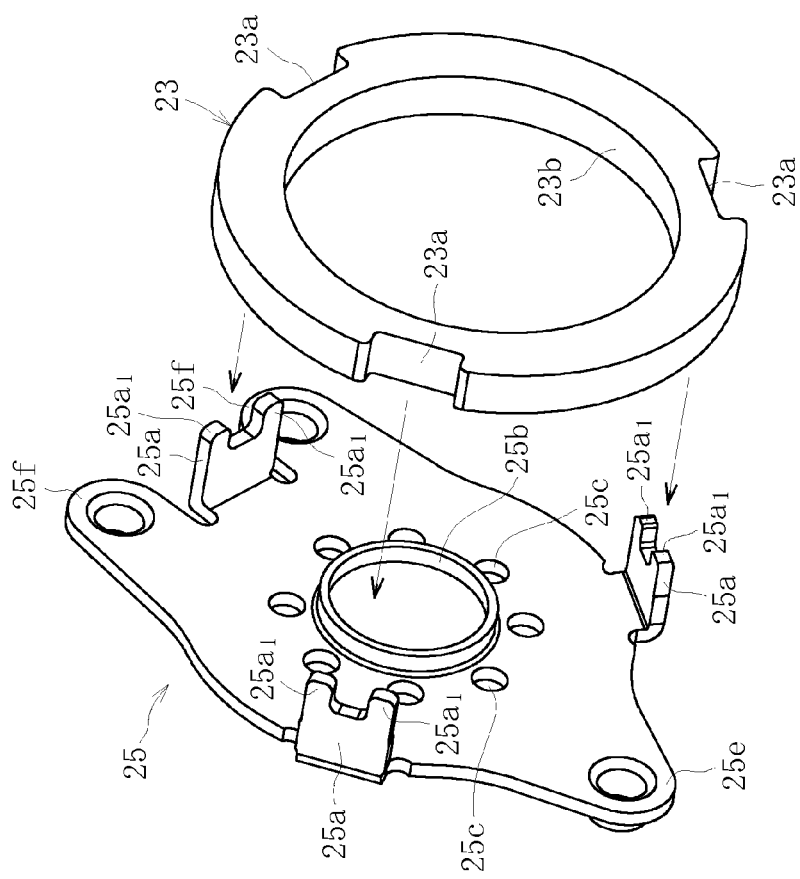
FIG. 27b A perspective view illustrating a state after the brake-side outer ring is assembled to the brake-side side plate.
Figure 28:
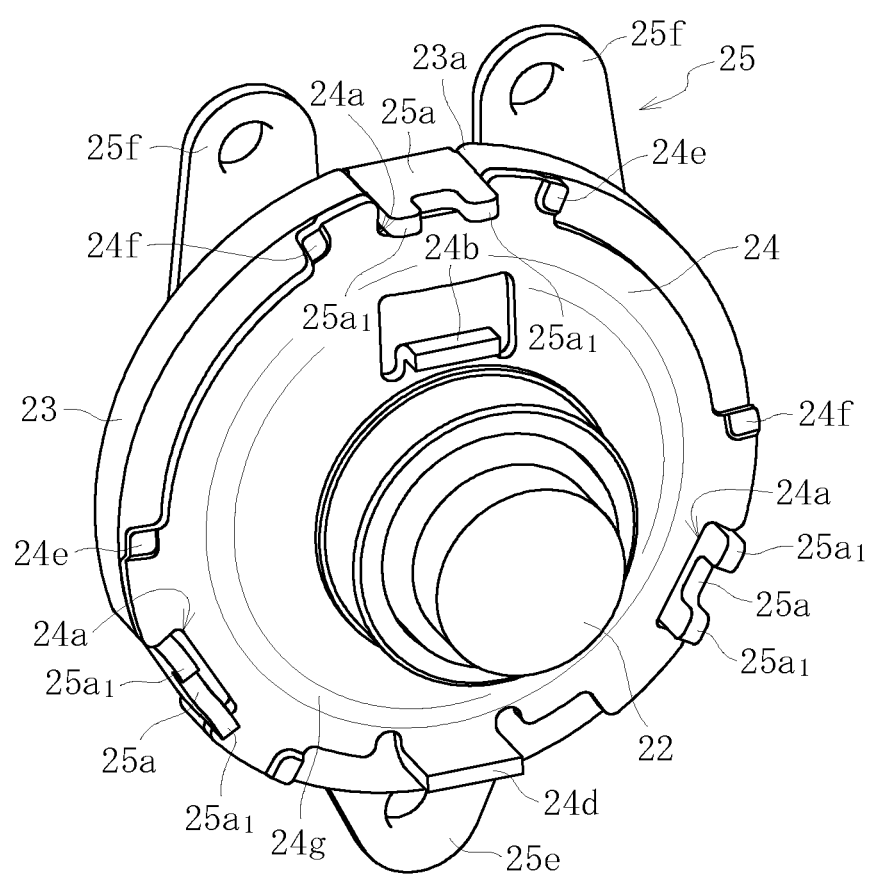
FIG. 28 A perspective view illustrating a state in which the brake-side outer ring and the cover are assembled to the brake-side side plate.
Figure 29:
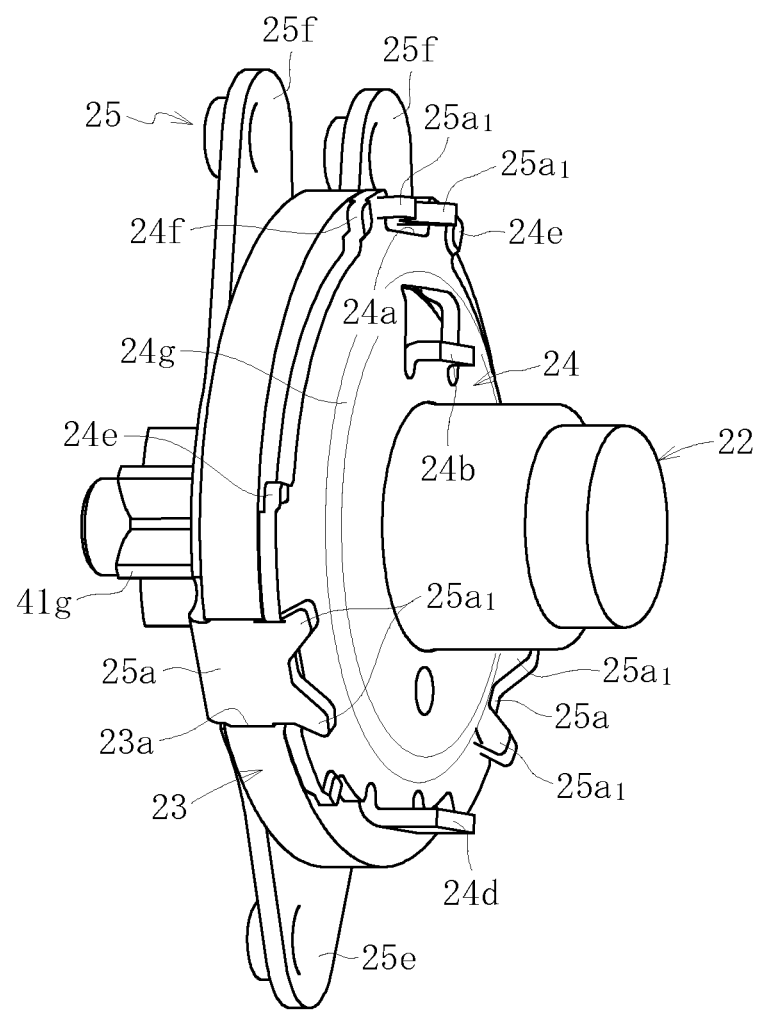
FIG. 29 A perspective view illustrating a state in which the brake-side side plate, the brake-side outer ring, and the cover are integrated with one another by swaging.
Figure 30:
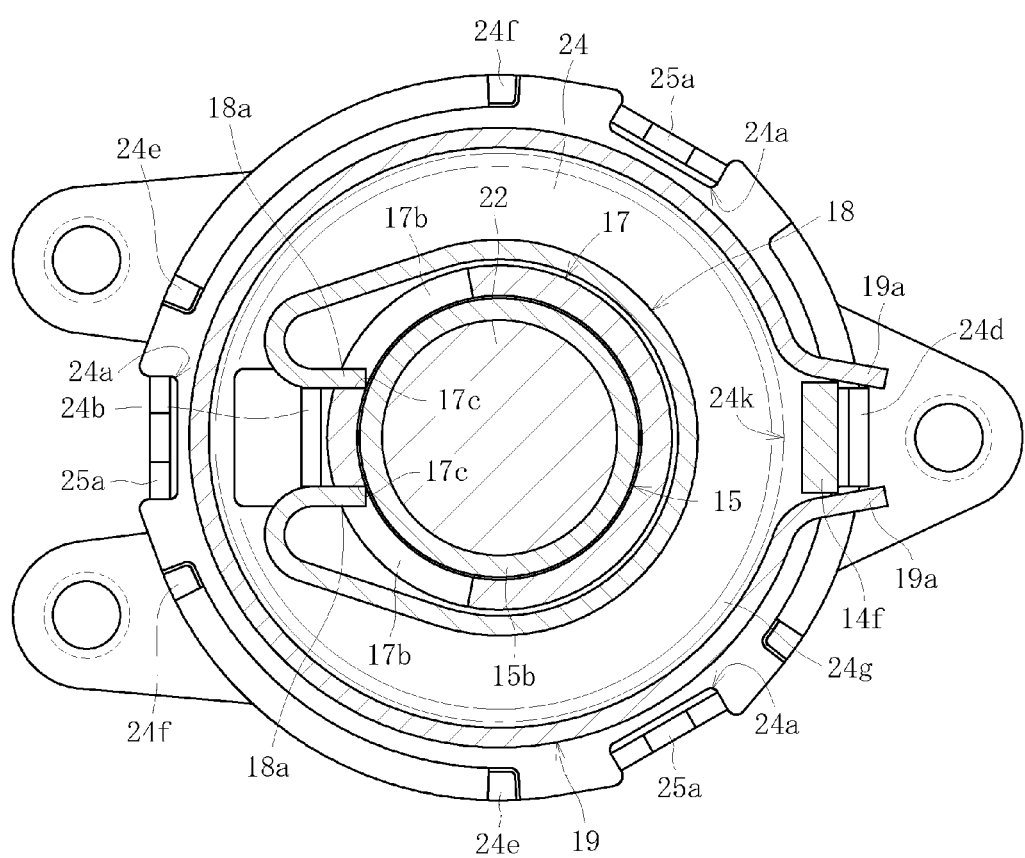
FIG. 30 A sectional view taken along the line C-C of FIG. 1.

A plurality of (three) cutout recessed portions 23a are formed on an outer periphery of the brake-side outer ring 23. Correspondingly to the cutout recessed portions 23a, a plurality of (three) cutout recessed portions 24a are similarly formed on an outer periphery of the cover 24. As illustrated in FIGS. 27a and 27b, claw portions 25a of the brake-side side plate 25 are inserted into the cutout recessed portions 23a of the brake-side outer ring 23, respectively. Further, as illustrated in FIG. 28, the claw portions 25a of the brake-side side plate 25 are inserted into the cutout recessed portions 24a of the cover 24, respectively.

The claw portions 25a of the brake-side side plate 25 are inserted into the cutout recessed portions 23a and 24a. By swaging the claw portions 25a of the brake-side side plate 25, the brake-side outer ring 23 and the cover 24 are coupled to each other and integrated with the brake-side side plate 25. Swaging of the claw portions 25a of the brake-side side plate 25 is performed by increasing outward the distance between bisected distal end portions $25a_1$ of each of the claw portions 25a with use of a swage (not shown) (see FIG. 29).

The wedge gaps 26 are formed between the inner peripheral surface 23b of the brake-side outer ring 23 and the cam surfaces 22a of the output shaft 22 (see FIG. 5). The cover 24 is provided with the claw portion 24b protruding in the axial direction, the claw portion 24b being arranged between the two lock portions 18a of the inner centering spring 18 of the lever-side clutch portion 11 (see FIGS. 11b, 31a, and 31b). The claw portion 24b of the cover 24 is formed by raising the surface of the cover 24 on the radially outer side of the claw-portion-formation position. The claw portion 24d protruding in the axial direction is formed on the outer periphery of the cover 24. The claw portion 24d is arranged between the two lock portions 19a of the outer centering spring 19 of the lever-side clutch portion 11 (see FIGS. 12a, 31a and 31b).

Figure 31A:
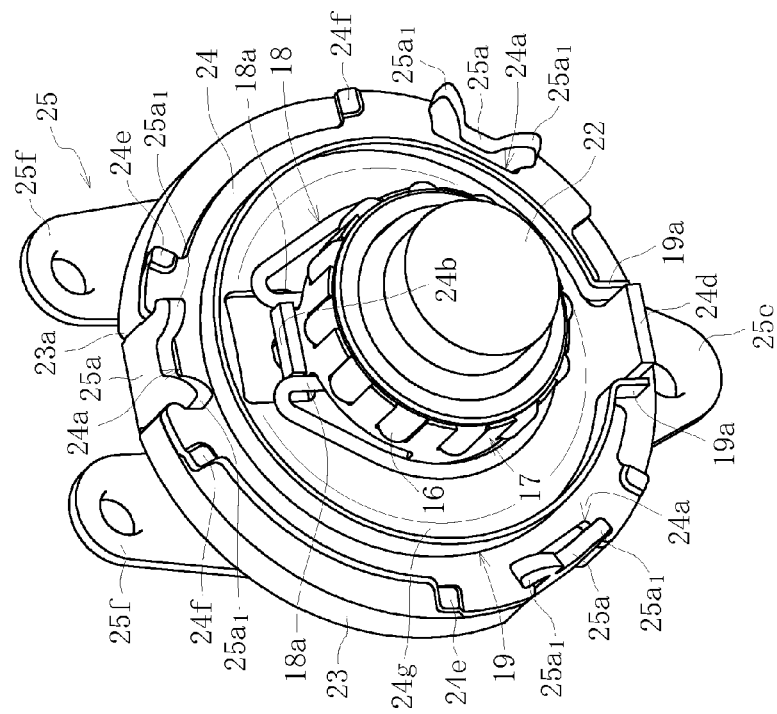
FIG. 31a A perspective view illustrating a state before the retainer is assembled to the brake-side side plate, the brake-side outer ring, the cover, and the inner centering spring.
Figure 31B:
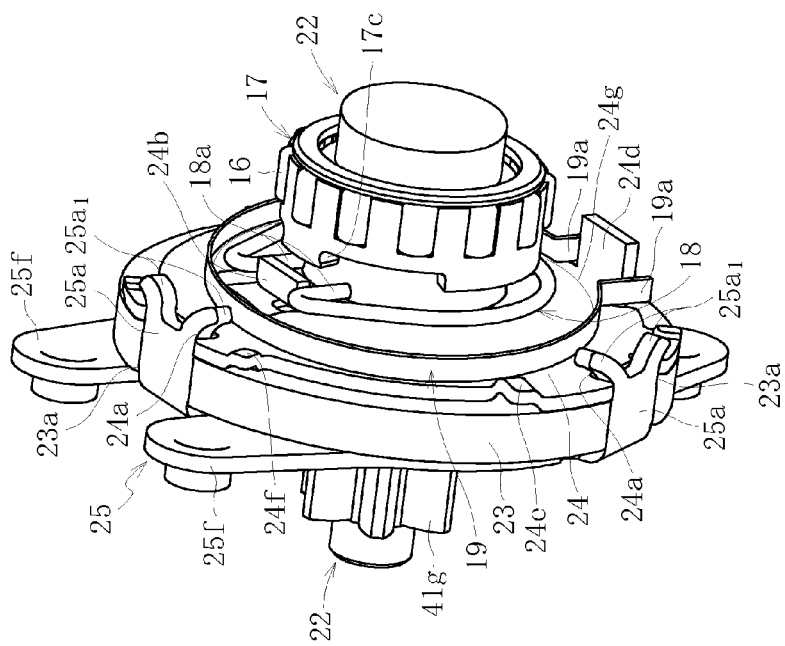
FIG. 31b A perspective view illustrating a state after the retainer is assembled to the brake-side side plate, the brake-side outer ring, the cover, and the inner centering spring.

Two pairs of the lock portions 24e and 24f are formed by stepping on the outer periphery of the cover 24 (see FIGS. 31a and 31b). In a state in which the cover 24 is held in contact with the end surface of the brake-side outer ring 23, in accordance with rotation of the lever-side outer ring 14, the lock portions 24e and 24f are allowed to be brought into abutment, in a rotational direction, on the claw portions 14g, which slide on the end surface of the brake-side outer ring 23. As a result, the lock portions 24e and 24f function as rotation stoppers for restricting an operating angle of the operation lever. In other words, when the lever-side outer ring 14 is rotated through operation of the operation lever, the claw portions 14g thereof move along the outer periphery of the cover 24 between the lock portions 24e and 24f of the cover 24.

On the outer periphery of the brake-side side plate 25, one flange portion 25e and two flange portions 25f are provided as clutch mounting portions with respect to the seat-lifter section (see FIGS. 2 to 4). In distal end portions of those three flange portions 25e and 25f, there are formed, by boring, mounting holes 25g and 25h for allowing mounting with respect to the seat-lifter section, and there are protrudingly formed, in the axial direction, cylindrical portions 25i and 25j in a manner of surrounding the mounting holes 25g and 25h.

Figure 18C:
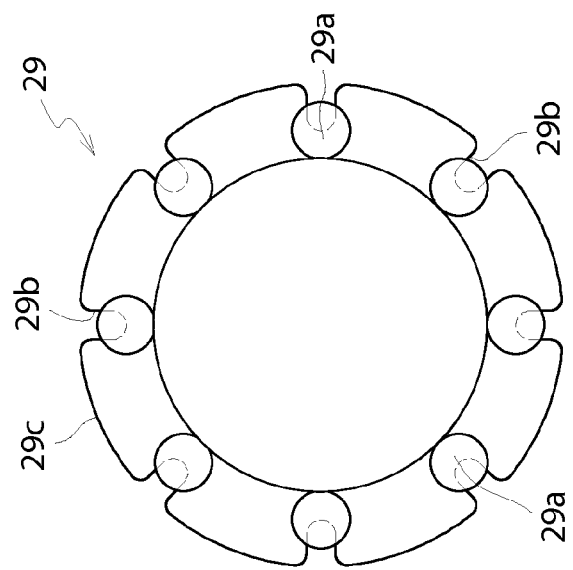
Figure 18A:
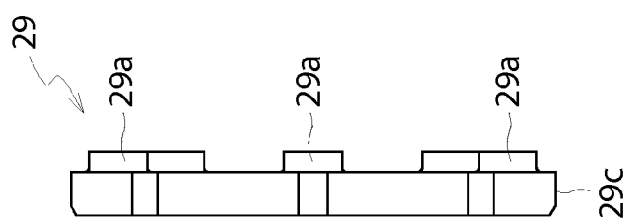
FIG. 18a A front view of a friction ring.
Figure 18B:
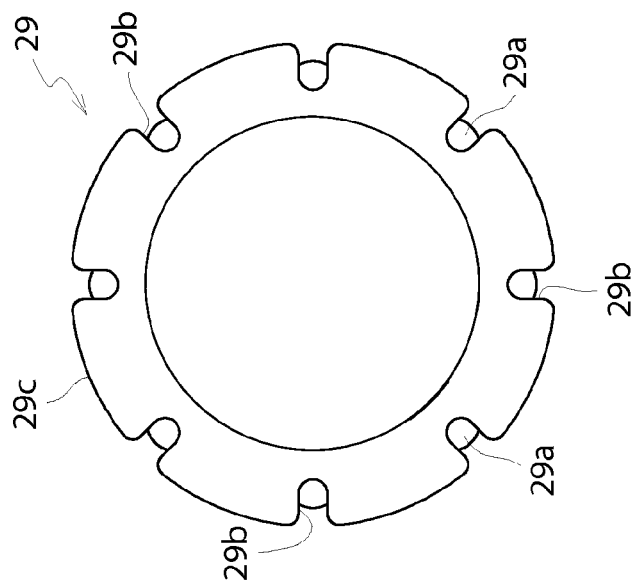

FIGS. 18a to 18c illustrate the friction ring 29 made of a resin. On an end surface of the friction ring 29, the plurality of circular protrusions 29a are equiangularly formed. By press-fitting and engaging the protrusions 29a into the holes 25c of the brake-side side plate 25, the friction ring 29 is fixed to the brake-side side plate 25 (see FIGS. 1 and 3).

In the case of press-fitting of the protrusions 29a, an engagement state with the holes 25c can be achieved due to elastic deformation of the protrusions 29a made of a resin material. By adopting a press-fit engagement structure of the protrusions 29a and the holes 25c, it is possible to prevent the friction ring 29 from falling off from the brake-side side plate 25 due to handling during transportation or the like. As a result, it is possible to increase handling properties at the time of assembly.

Figure 14C:
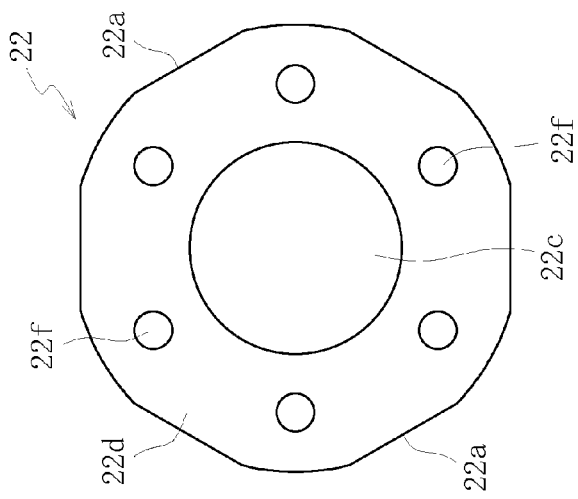
Figure 14A:
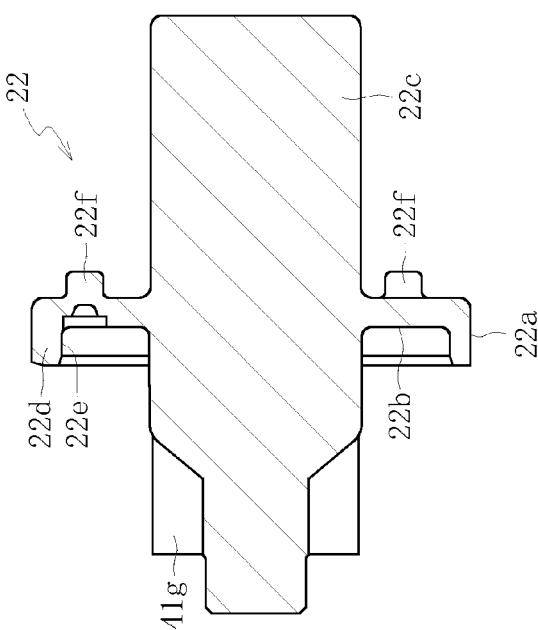
FIG. 14a A sectional view of the output shaft.
Figure 14B:
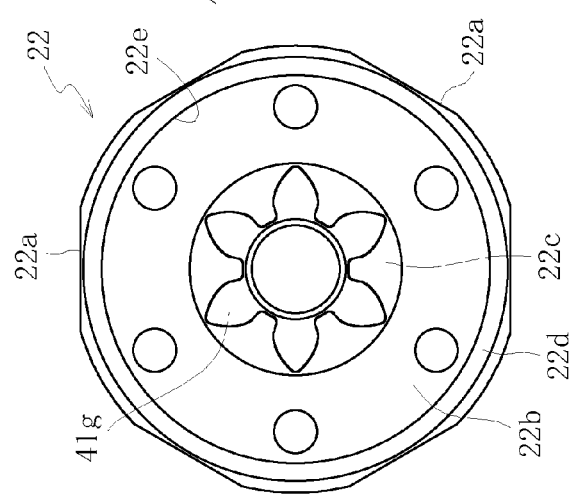

The friction ring 29 is press-fitted to an inner peripheral surface 22e of the annular recessed portion 22b formed in the larger diameter portion 22d of the output shaft 22 with fastening allowance (i.e. a fixed relationship) (see FIGS. 13a, 14a and 14b). Due to a frictional force generated between an outer peripheral surface 29c of the friction ring 29 and the inner peripheral surface 22e of the annular recessed portion 22b of the output shaft 22, rotational resistance is imparted to the output shaft 22.

On the outer peripheral surface 29c of the friction ring 29, there are equiangularly formed a plurality of recessed groove-like slits 29b (see FIG. 5). With provision of the slits 29b as in this case, elasticity may be imparted to the friction ring 29. Thus, a rate of change in sliding torque is not increased with respect to inner diameter tolerance of the output shaft 22 and outer diameter tolerance of the friction ring 29.

In other words, it is possible to reduce a setting range of rotational resistance imparted by the frictional force generated between the outer peripheral surface 29c of the friction ring 29 and the inner peripheral surface 22e of the annular recessed portion 22b of the output shaft 22, and hence to appropriately and easily set the degree of the rotational resistance. Further, the slits 29b serve as grease pools, and hence it is possible to suppress abrasion of the outer peripheral surface 29c of the friction ring 29 due to sliding with respect to the inner peripheral surface 22e of the annular recessed portion 22b of the output shaft 22.

The friction ring 29 is made of a material capable of keeping a fastening allowance between the output shaft 22 and the friction ring 29. It is preferred that polybutylene terephthalate (PBT) be used as the material. Thus, the friction ring 29 is made of polybutylene terephthalate, and hence reduction in fastening allowance of the friction ring 29 over time can be easily suppressed. As a result, even if excessive torque is applied to the output shaft 22, when a locked state of the brake-side clutch portion 12 is released through lever operation performed at the lever-side clutch portion 11, predetermined rotational resistance can be imparted to the output shaft 22. Accordingly, it is possible to prevent occurrence of strong vibration caused by an increase in contact pressure of the cylindrical rollers 27. Note that, as the material for the friction ring, materials other than the above-mentioned polybutylene terephthalate may be used as long as the materials can keep the fastening allowance between the output shaft 22 and the friction ring.

Figure 36:
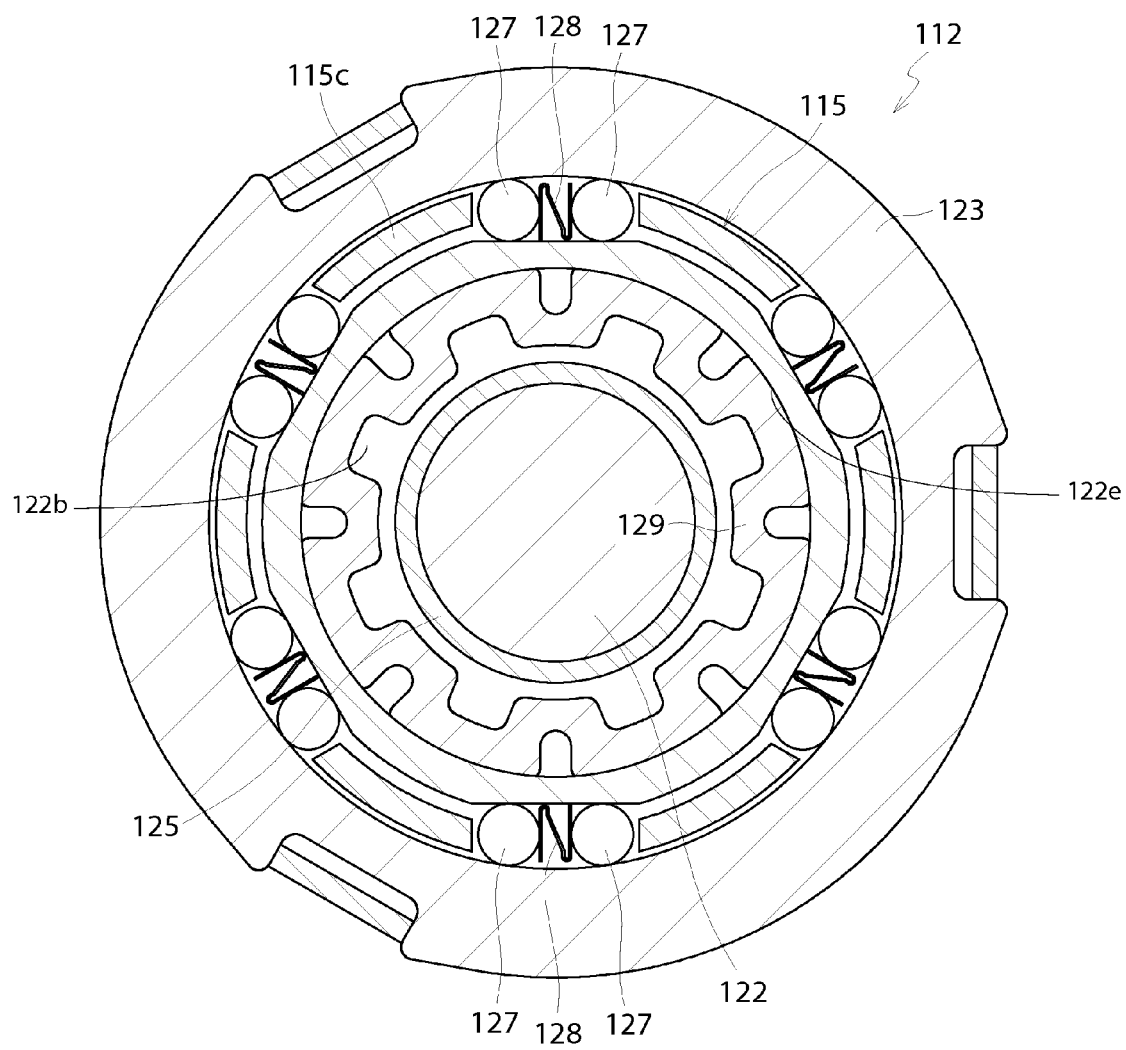
FIG. 36 A lateral sectional view taken along the line E-E of FIG. 34.

An inner peripheral surface 29d of the friction ring 29 is formed into a circular shape concentric with the outer peripheral surface 29c of the friction ring 29 (see FIGS. 5, 18b, and 18c). Thus, the inner peripheral surface 29d of the friction ring 29 is formed into a circular shape, and hence rigidity of the friction ring 29 can be increased as compared to rigidity of the conventional friction ring 129 (see FIG. 36). Accordingly, it is possible to increase durability of the entire clutch unit.

As described above, although the friction ring 29 is press-fitted to the inner peripheral surface 22e of the annular recessed portion 22b formed in the larger diameter portion 22d of the output shaft 22 with a fastening allowance, the friction ring 29 is made of a resin, and hence burrs may occur on the outer peripheral surface 29c of the friction ring 29 at the time of the press-fitting.

Figure 25:
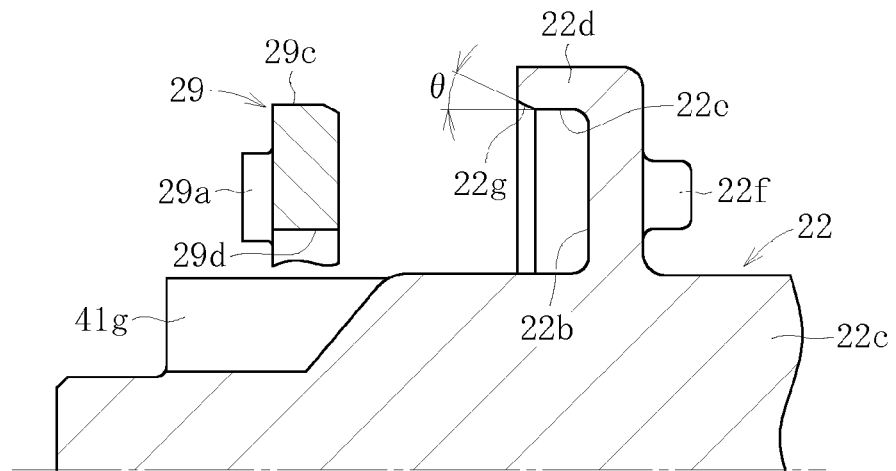
FIG. 25 A partially enlarged sectional view illustrating a state before the friction ring is assembled to the output shaft by press-fitting.

Therefore, as illustrated in FIG. 25, a chamfer angle $\theta$ of a chamfered portion 22g is set to 20° to 25°, the chamfered portion 22g being formed on a peripheral edge portion of the annular recessed portion 22b of the output shaft 22. Thus, a range of the chamfer angle $\theta$ is determined, and hence when the friction ring 29 is press-fitted to the annular recessed portion 22b of the output shaft 22, it is possible to smoothly press-fit the friction ring 29 to the annular recessed portion 22b, and to prevent the occurrence of burrs. Note that, in a case where the chamfer angle $\theta$ is smaller than 20°, burrs are more likely to occur. On the other hand, in a case where the chamfer angle $\theta$ is larger than 25°, press-fitting load is increased, which leads to a difficulty in press-fitting.

Figure 26:
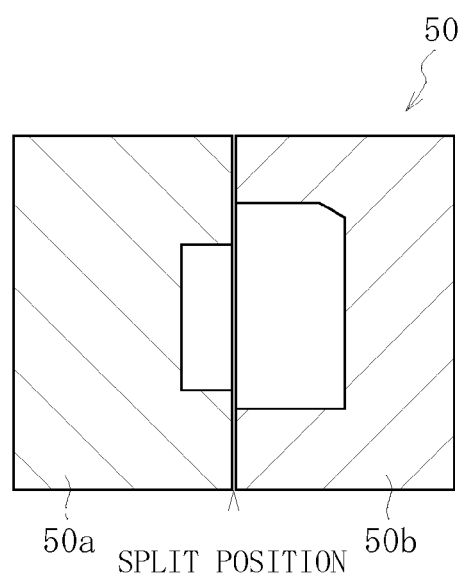
FIG. 26 A sectional view illustrating molding dies for manufacturing the friction ring.

In addition, when the friction ring 29 made of a resin is manufactured using molding dies 50, as illustrated in FIG. 26, one die 50a and another die 50b are split at a position at which a bottom of the protrusion 29a is to be molded. The friction ring 29 is manufactured using the molding dies 50 described above, and hence a part of the friction ring 29, which is to be press-fitted to the annular recessed portion 22b of the output shaft 22, is molded in only the another die 50b. Accordingly, burrs are less likely to occur at the time of press-fitting.

Description is made on operation of the lever-side clutch portion 11 and the brake-side clutch portion 12 of the clutch unit X structured as described above.

In the lever-side clutch portion 11, when the input torque is applied to the lever-side outer ring 14, the cylindrical rollers 16 are engaged into the wedge gaps 20 between the lever-side outer ring 14 and the inner ring 15. The inner ring 15 is rotated with torque transmitted to the inner ring 15 through the intermediation of the cylindrical rollers 16. Simultaneously, an elastic force is accumulated in both the centering springs 18 and 19 in accordance with the rotation of the lever-side outer ring 14 and the retainer 17. When the input torque is interrupted, the lever-side outer ring 14 and the retainer 17 are restored to a neutral state with the elastic force of both the centering springs 18 and 19. Meanwhile, the inner ring 15 is maintained at the fixed rotational position. Accordingly, the inner ring 15 is rotated in an inching manner with repetitive rotation of the lever-side outer ring 14, in other words, pumping operation of the operation lever.

In the brake-side clutch portion 12, when reverse-input torque is input to the output shaft 22, the cylindrical rollers 27 are engaged into the wedge gaps 26 between the output shaft 22 and the brake-side outer ring 23 so as to lock the output shaft 22 with respect to the brake-side outer ring 23. Accordingly, the torque reversely input from the output shaft 22 is locked by the brake-side clutch portion 12 so as to interrupt back-flow of the torque to be reverse-input to the lever-side clutch portion 11.

Meanwhile, the torque input from the lever-side outer ring 14 is input to the inner ring 15 through the intermediation of the lever-side clutch portion 11. When the inner ring 15 is brought into abutment on the cylindrical rollers 27 and presses the cylindrical rollers 27 against the elastic force of the plate springs 28, the cylindrical rollers 27 are disengaged from the wedge gaps 26 and a locked state of the output shaft 22 is released. As a result, the output shaft 22 is allowed to be rotated. When the inner ring 15 is further rotated, clearances between the holes 15d of the inner ring 15 and the protrusions 22f of the output shaft 22 are narrowed, and the inner ring 15 is brought into abutment on the protrusions 22f of the output shaft 22 in a rotational direction. As a result, the torque input from the inner ring 15 is transmitted to the output shaft 22 through the intermediation of the protrusions 22f, and the output shaft 22 is rotated.

Figure 32:
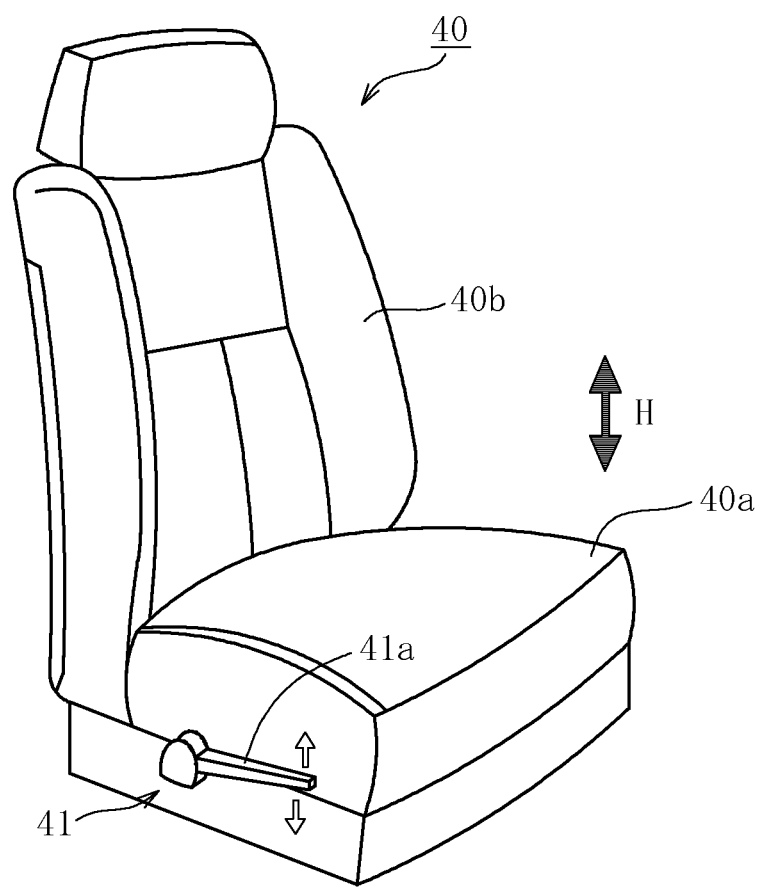
FIG. 32 A conceptual view of a seat of an automobile.

The clutch unit X provided with the structure as described above in detail is used while being incorporated into, for example, an automobile seat-lifter section. FIG. 32 illustrates a seat 40 installed in a cabin of an automobile. The seat 40 comprises a sitting seat 40a, a backrest seat 40b, and the seat-lifter section 41 for adjusting a height H of the sitting seat 40a. Adjustment of the height H of the sitting seat 40a is performed with an operation lever 41a of the seat-lifter section 41.

Figure 33A:
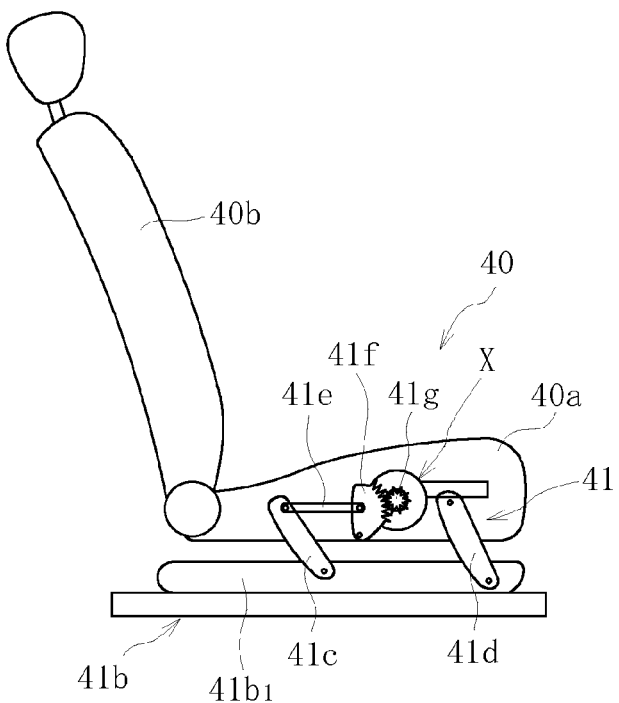
FIG. 33a A conceptual view of a structural example of a seat-lifter section.

FIG. 33a is a conceptual view of a structural example of the seat-lifter section 41. One ends of link members 41c and 41d are pivotally mounted to a slide movable member $41b_1$ of a seat slide adjuster 41b. The other ends of the link members 41c and 41d are pivotally mounted to the sitting seat 40a. The other end of the link member 41c is pivotally mounted to a sector gear 41f through intermediation of a link member 41e. The sector gear 41f is pivotally mounted to the sitting seat 40a, and pivotable about a fulcrum $41f_1$. The other end of the link member 41d is pivotally mounted to the sitting seat 40a.

The clutch unit X described above in this embodiment is fixed to an appropriate position of the sitting seat 40a. Fixation of the clutch unit X to the sitting seat 40a is fixation by swaging to a seat frame (not shown) of the sitting seat 40a, in which the three flange portions 25e and 25f of the brake-side side plate 25 are subjected to plastic deformation in a manner that the distal end portions of the cylindrical portions 25i and 25j are increased in diameter outward.

Meanwhile, the operation lever 41a made of, for example, a resin is coupled to the lever-side sideplate 13 of the lever-side clutch portion 11, and the pinion gear 41g meshing with the sector gear 41f as a rotary member is provided to the output shaft 22 of the brake-side clutch portion 12. As illustrated in FIGS. 1, 13a, 13b, 14a, and 14b, the pinion gear 41g is integrally formed at a distal end portion of the shaft portion 22c of the output shaft 22.

Figure 33B:
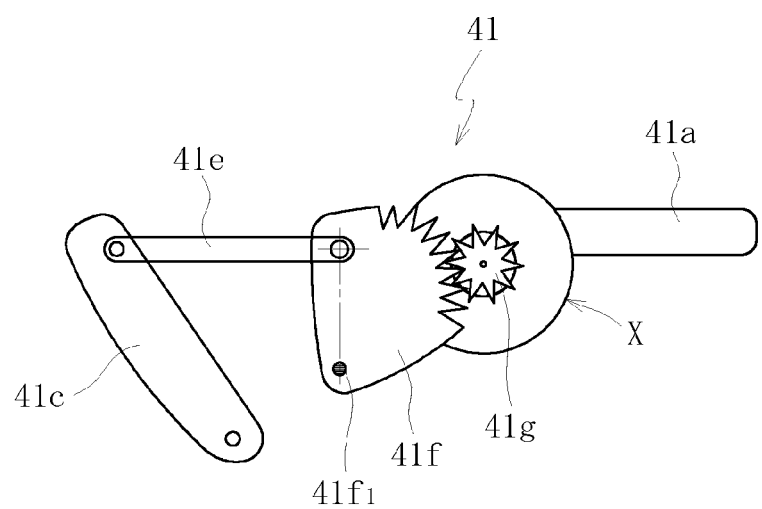
Figure 34:
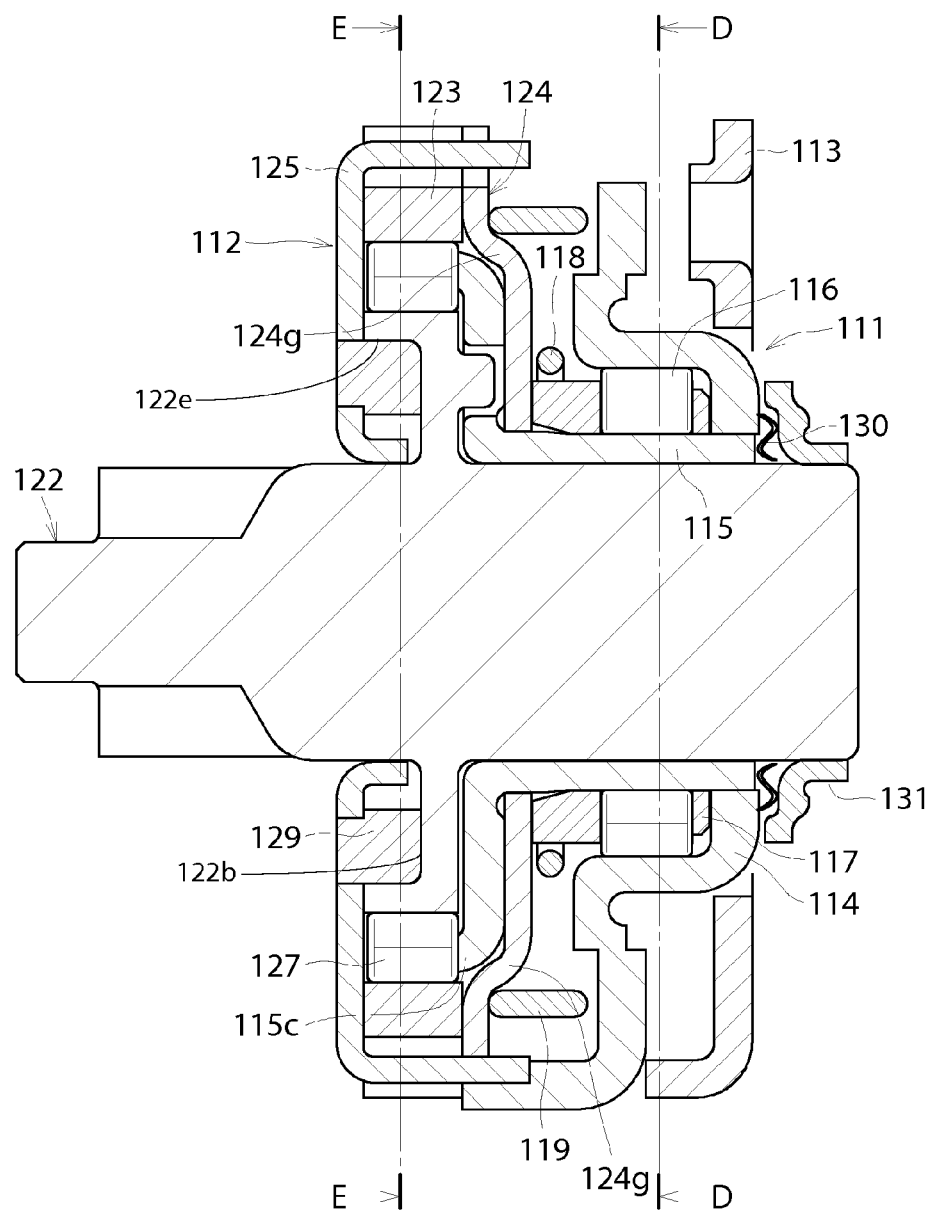
FIG. 34 A longitudinal sectional view of an overall structure of a conventional clutch unit.
Figure 35:
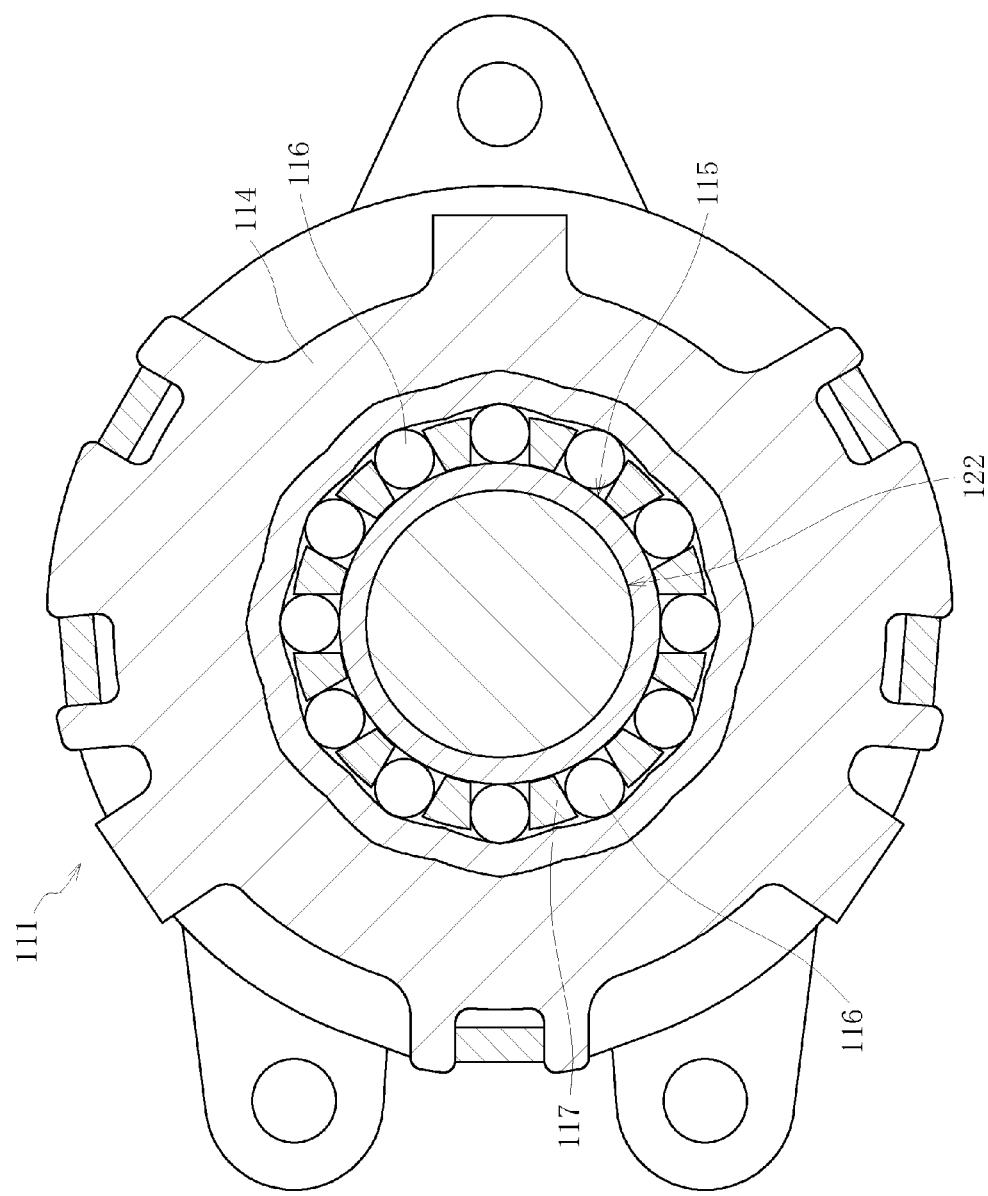
FIG. 35 A lateral sectional view taken along the line D-D of FIG. 34.

In FIG. 33b, when the operation lever 41a is pivoted counterclockwise (upward), torque input in that direction is transmitted to the pinion gear 41g through intermediation of the clutch unit X so that the pinion gear 41g pivots counterclockwise. Then, the sector gear 41f meshing with the pinion gear 41g pivots clockwise so as to pull the other end of the link member 41c through intermediation of the link member 41e. As a result, the link member 41c and the link member 41d stand together, and a seat surface of the sitting seat 40a becomes higher.

In this manner, when the operation lever 41a is released after adjustment of the height H of the sitting seat 40a, the operation lever 41a pivots clockwise with the elastic force of the two centering springs 18 and 19, and returns to the original position (restores to the neutral state). Note that, when the operation lever 41a is pivoted clockwise (downward), the seat surface of the sitting seat 40a is lowered through operation in an opposite direction as that in the case described above. Further, when the operation lever 41a is released after adjustment of the height, the operation lever 41a pivots counterclockwise and returns to the original position (restores to the neutral state).

The present invention is not limited to the foregoing description in this embodiment. As a matter of course, the present invention may be carried out in various modes without departing from the spirit of the present invention. The scope of the present invention is defined by claims, and includes the meaning of an equivalent of the claims and all the modifications within the claims

The invention claimed is:

1. A clutch unit, comprising:
a lever-side clutch portion provided on an input side, for controlling transmission and interruption of rotational torque to an output side through a lever operation; and
a brake-side clutch portion provided on the output side, for transmitting torque input from the lever-side clutch portion to the output side and for interrupting torque reversely input from the output side, wherein:
the lever-side clutch portion comprises:
an input-side member to be rotated through the lever operation;
a stationary-side member restricted in rotation; and
an elastic member provided between the input-side member and the stationary-side member, for accumulating an elastic force obtained by torque input from the input-side member and for restoring the input-side member to a neutral state with the accumulated elastic force through releasing of the torque input from the input-side member,
the elastic member comprising a band spring member having a C-shape and a pair of lock portions formed by bending both ends thereof to a radially outer side, and
the stationary-side member comprising an inclined portion which abuts on the elastic member and swells to an elastic member side;
under a state in which the elastic member is assembled, an inner diameter of the elastic member is arranged on an outer side of an outermost diameter of the inclined portion of the stationary-side member; and
under the state in which the elastic member is assembled, a distance between an inner diameter of a region of the elastic member, which is displaced by 180° from the pair of lock portions, and the outermost diameter of the inclined portion of the stationary-side member is set larger than a distance between an inner diameter of a region of the elastic member, which is displaced by 90° from the pair of lock portions, and the outermost diameter of the inclined portion of the stationary-side member.

2. The clutch unit according to claim 1, wherein under the state in which the elastic member is assembled, an interval between distal ends of the pair of lock portions of the elastic member is set larger than an interval between proximal ends of the pair of lock portions of the elastic member.

3. The clutch unit according to claim 1, wherein the inclined portion of the stationary-side member is formed into a cylindrical shape.

4. The clutch unit according to claim 1, wherein the lever-side clutch portion further comprises:
a coupling member for transmitting the torque input from the input-side member to the brake-side clutch portion;
a plurality of engagement elements for controlling transmission and interruption of the torque input from the input-side member through engagement and disengagement between the input-side member and the coupling member; and a retainer for retaining the plurality of engagement elements at predetermined intervals in a circumferential direction; and another elastic member provided between the retainer and the stationary-side member, for accumulating an elastic force obtained by the torque input from the input-side member and for restoring the retainer to a neutral state with the accumulated elastic force through releasing of the torque input from the input-side member.

5. The clutch unit according to claim 4, wherein at least one of the plurality of engagement elements of the lever-side clutch portion and a plurality of pairs of engagement elements of the brake-side clutch portion comprise cylindrical rollers.

6. The clutch unit according to claim 1, wherein the brake-side clutch portion comprises:
the coupling member to which torque is input from the lever-side clutch portion;
an output-side member from which the torque is output;
a stationary-side member restricted in rotation; and
a plurality of pairs of engagement elements arranged in wedge gaps between the stationary-side member and the output-side member, for controlling transmission of the torque input from the coupling member and interruption of the torque reversely input from the output-side member through engagement and disengagement between the stationary-side member and the output-side member.

7. The clutch unit according to claim 1, wherein the lever-side clutch portion and the brake-side clutch portion are incorporated in an automobile seat-lifter section.

8. The clutch unit according to claim 7, wherein:
the input-side member of the lever-side clutch portion is connected to an operation lever; and
an output-side member of the brake-side clutch portion is coupled to a link mechanism of the automobile seat-lifter section.

9. A clutch unit, comprising:
a lever-side clutch portion provided on an input side, for controlling transmission and interruption of rotational torque to an output side through a lever operation; and
a brake-side clutch portion provided on the output side, for transmitting torque input from the lever-side clutch portion to the output side and for interrupting torque reversely input from the output side, wherein:
the lever-side clutch portion comprises:
an input-side member to be rotated through the lever operation;
a stationary-side member restricted in rotation;
a retainer for retaining a plurality of engagement elements at predetermined intervals in a circumferential direction, the plurality of engagement elements controlling transmission and interruption of torque input from the input-side member; and
an elastic member provided between the retainer and the stationary-side member, for accumulating an elastic force obtained by the torque input from the input-side member and for restoring the retainer to a neutral state with the accumulated elastic force through releasing of the torque input from the input-side member,
the elastic member comprising a C-shaped spring member which comprises a pair of lock portions formed by bending both ends thereof to a radially inner side;
under a state in which the elastic member is assembled, an interval between distal ends of the pair of lock portions is set smaller than an interval between proximal ends of the pair of lock portions; and
when the elastic member is extended by the torque input from the input-side member, a force acting on the lock portions of the elastic member is directed to a radially inner side.

10. The clutch unit according to claim 9, wherein under the state in which the elastic member is assembled, a gap is interposed between an inner diameter of the elastic member and an outer diameter of the retainer.

11. The clutch unit according to claim 9, wherein under the state in which the elastic member is assembled, an inner diameter of a region of the elastic member, which is displaced by 180° from the pair of lock portions, is brought into abutment on an outer diameter of the retainer.

12. The clutch unit according to claim 9, wherein:
the lever-side clutch portion further comprises:
a coupling member for transmitting the torque input from the input-side member to the brake-side clutch portion; and
another elastic member provided between the input-side member and the stationary-side member, for accumulating an elastic force by the torque input from the input-side member and for restoring the input-side member to a neutral state with the accumulated elastic force through releasing of the torque input from the input-side member; and
the plurality of engagement elements control transmission and interruption of the torque input from the input-side member through engagement and disengagement between the input-side member and the coupling member.

13. The clutch unit according to claim 9, wherein the brake-side clutch portion comprises:
a coupling member to which torque is input from the lever-side clutch portion;
an output-side member from which the torque is output;
the stationary-side member restricted in rotation; and
a plurality of pairs of engagement elements arranged in wedge gaps between the stationary-side member and the output-side member, for controlling transmission of the torque input from the coupling member and interruption of the torque reversely input from the output-side member through engagement and disengagement between the stationary-side member and the output-side member.

14. The clutch unit according to claim 9, wherein the lever-side clutch portion and the brake-side clutch portion are incorporated in an automobile seat-lifter section.

15. A clutch unit, comprising:
a lever-side clutch portion provided on an input side, for controlling transmission and interruption of rotational torque to an output side through a lever operation; and
a brake-side clutch portion provided on the output side, for transmitting torque input from the lever-side clutch portion to the output side and for interrupting torque reversely input from the output side, wherein:
the brake-side clutch portion comprises:
an output-side member from which torque is output;
a stationary-side member restricted in rotation; and
a friction ring provided to the stationary-side member, for imparting rotational resistance to the output-side member by a frictional force which is generated between the output-side member and the friction ring by press-fitting the friction ring to the output-side member; and the friction ring has an inner diameter formed in a circular shape and is made of a material capable of keeping a fixed relationship between the output-side member and the friction ring.

16. The clutch unit according to claim 15, wherein the friction ring is made of polybutylene terephthalate.

17. The clutch unit according to claim 15, wherein:
the friction ring is press-fitted to an annular recessed portion formed in the output-side member; and
the annular recessed portion comprises a chamfered portion formed on a peripheral edge portion thereof, the chamfered portion having a chamfer angle of 20° to 25°.

18. The clutch unit according to claim 15, wherein the lever-side clutch portion comprises:
an input-side member to which torque is input through the lever operation;
a coupling member for transmitting the torque input from the input-side member to the brake-side clutch portion;
a plurality of engagement elements for controlling transmission and interruption of the torque input from the input-side member through engagement and disengagement between the input-side member and the coupling member;
a retainer for retaining the plurality of engagement elements at predetermined intervals in a circumferential direction;
the stationary-side member restricted in rotation;
a first elastic member provided between the retainer and the stationary-side member, for accumulating an elastic force obtained by the torque input from the input-side member and for restoring the retainer to a neutral state with the accumulated elastic force through releasing of the torque input from the input-side member; and
a second elastic member provided between the input-side member and the stationary-side member, for accumulating an elastic force by the torque input from the input-side member and for restoring the input-side member to a neutral state with the accumulated elastic force through releasing of the torque input from the input-side member.

19. The clutch unit according to claim 15, wherein the brake-side clutch portion further comprises:
a coupling member to which torque is input from the lever-side clutch portion; and
a plurality of pairs of engagement elements arranged in wedge gaps between the stationary-side member and the output-side member, for controlling transmission of the torque input from the coupling member and interruption of the torque reversely input from the output-side member through engagement and disengagement between the stationary-side member and the output-side member.

20. The clutch unit according to claim 15, wherein the lever-side clutch portion and the brake-side clutch portion are incorporated in an automobile seat-lifter section.

* * * * *